INVENTORS
C. ASCHENBRENNER
U. K. HEIDELAUF
H. R. MESTWERDT
B. K. WERNICKE
BY
ATTORNEYS

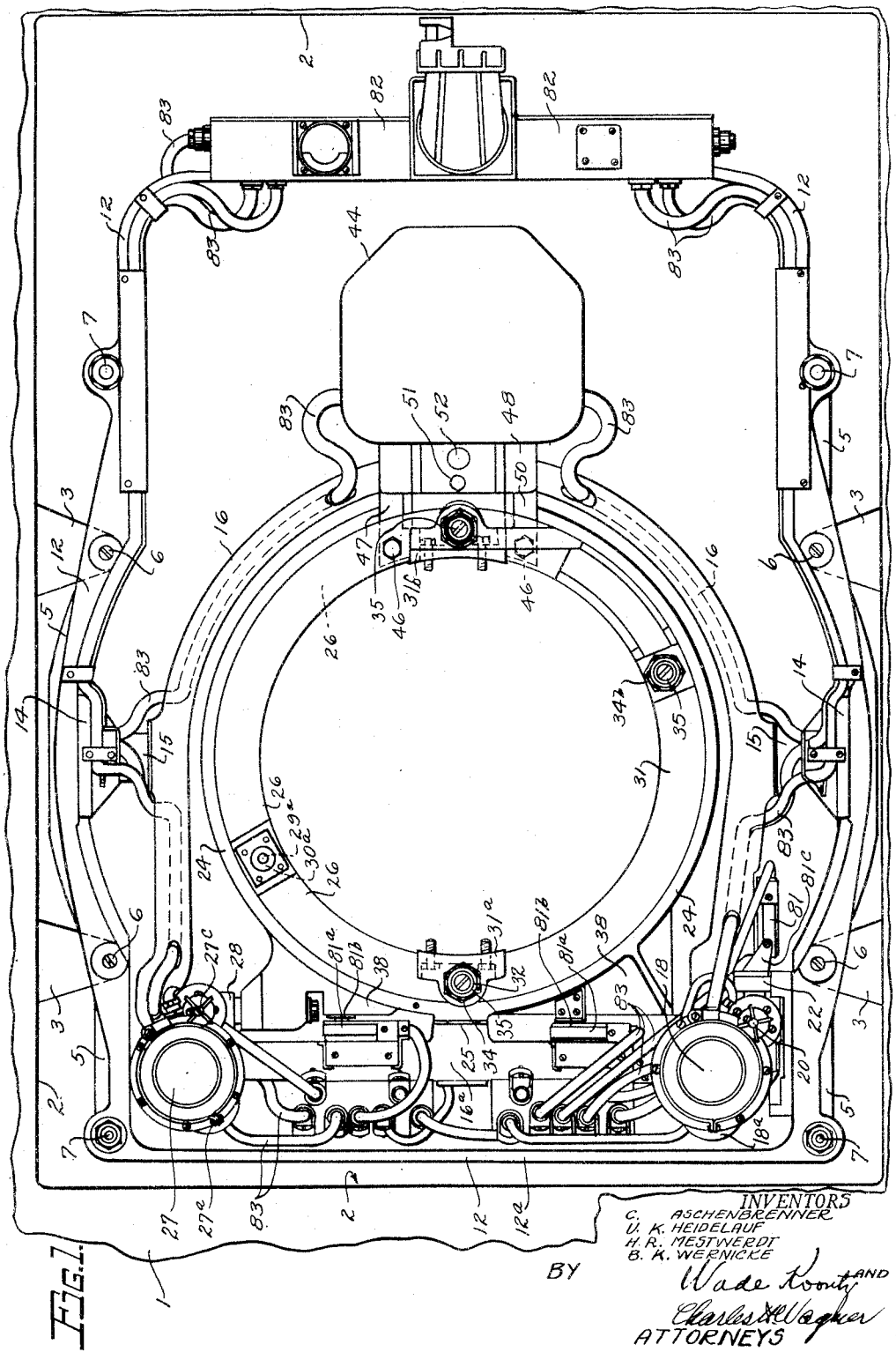

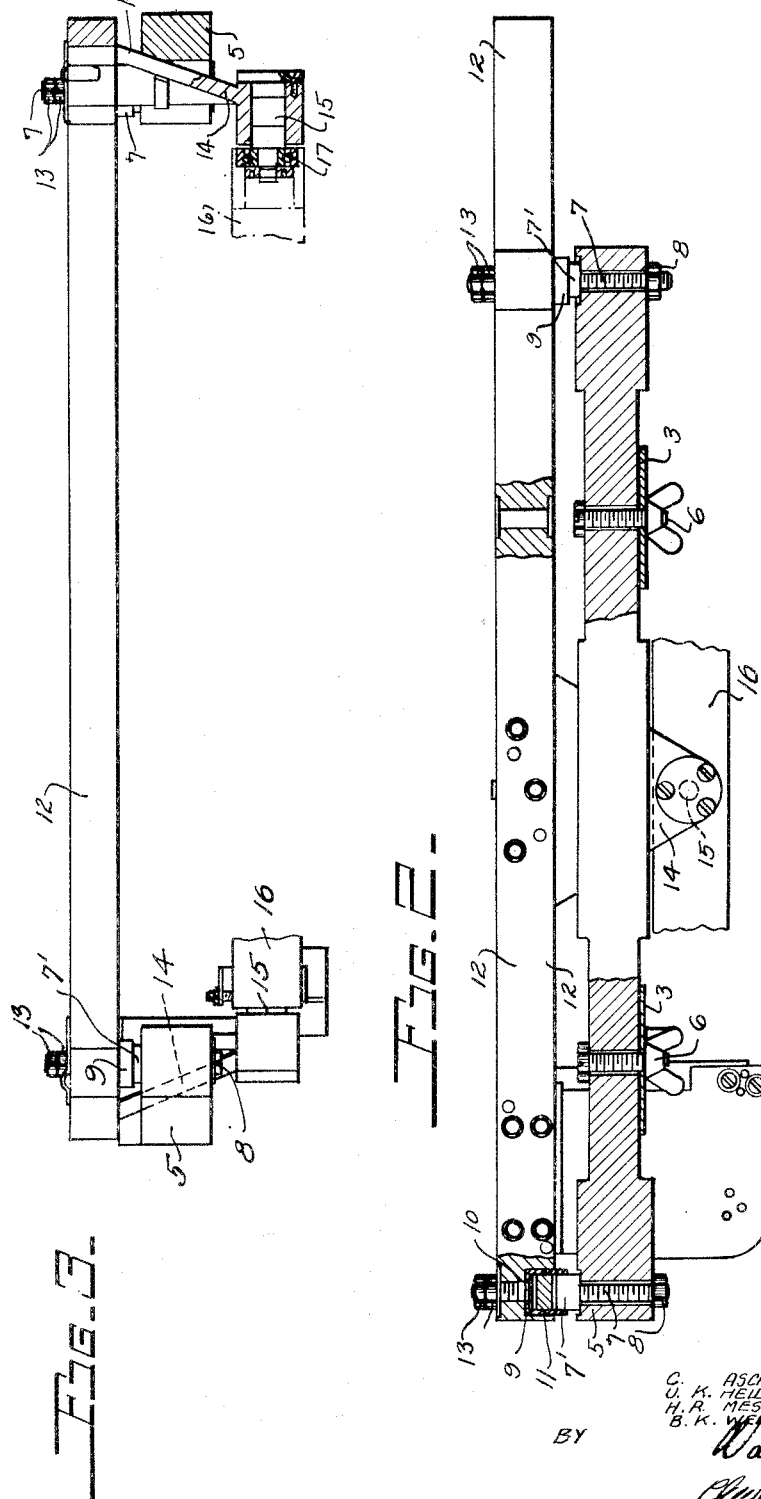

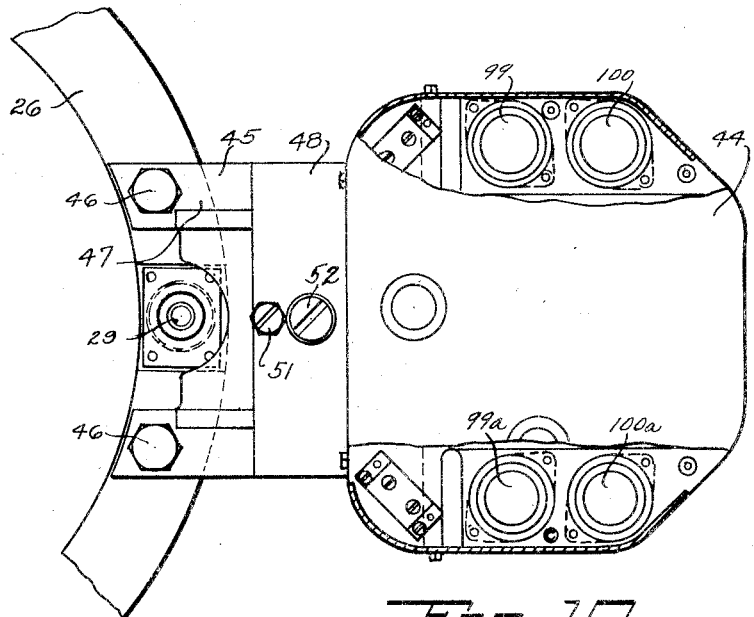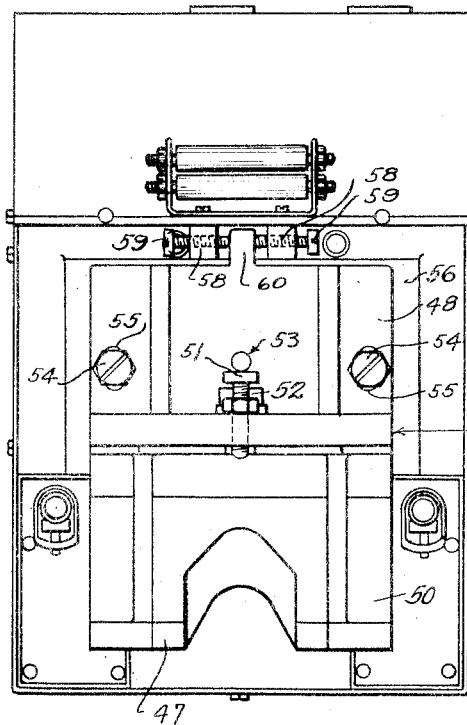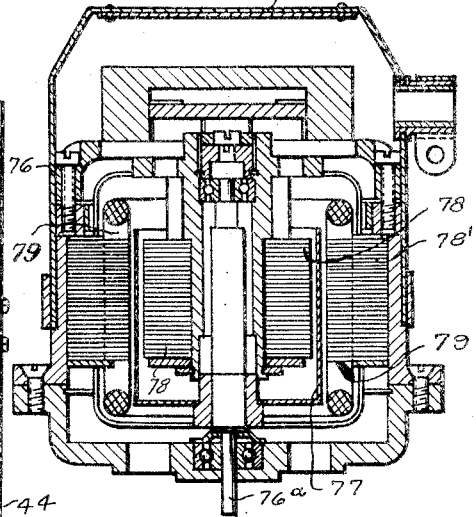

Sept. 26, 1950     C. ASCHENBRENNER ET AL     2,523,267
GYRO-STABILIZED AERIAL CAMERA MOUNT
Filed March 8, 1948     7 Sheets-Sheet 5
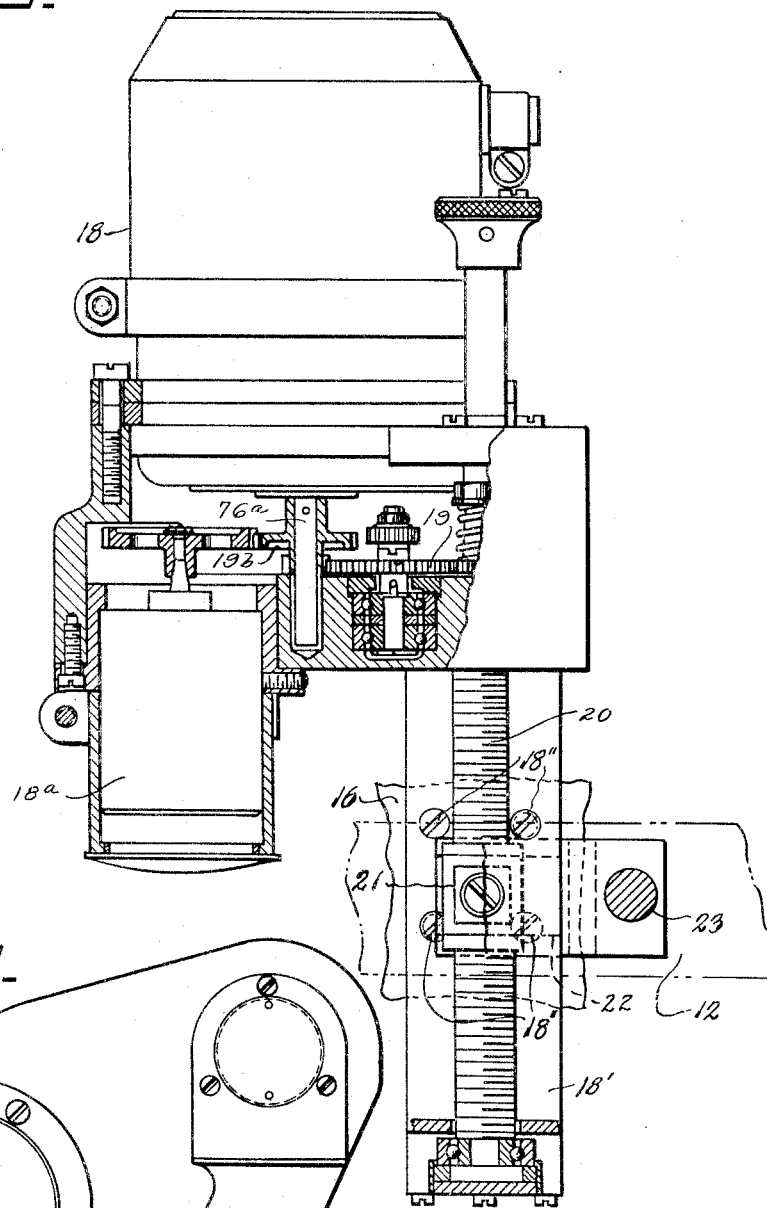
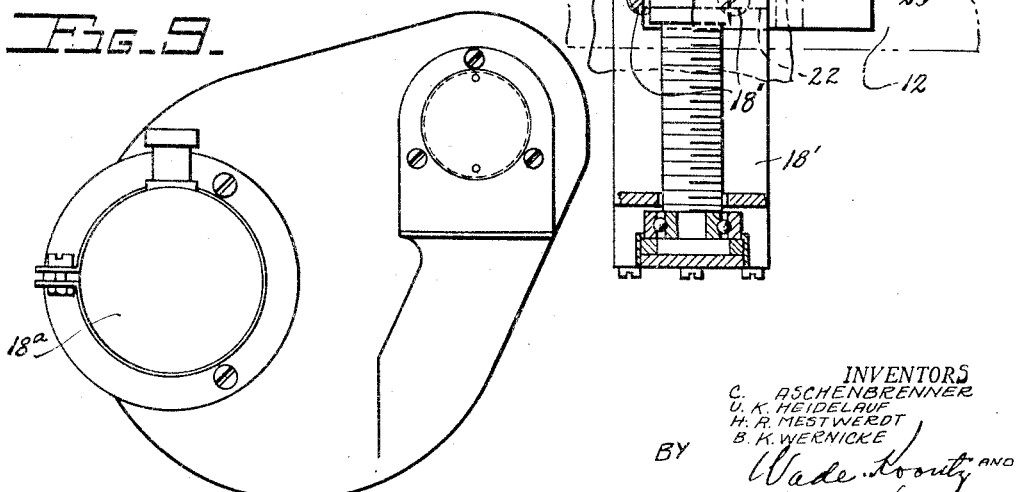
INVENTORS
C. ASCHENBRENNER
U. K. HEIDELAUF
H. R. MESTWERDT
B. K. WERNICKE
BY
ATTORNEYS

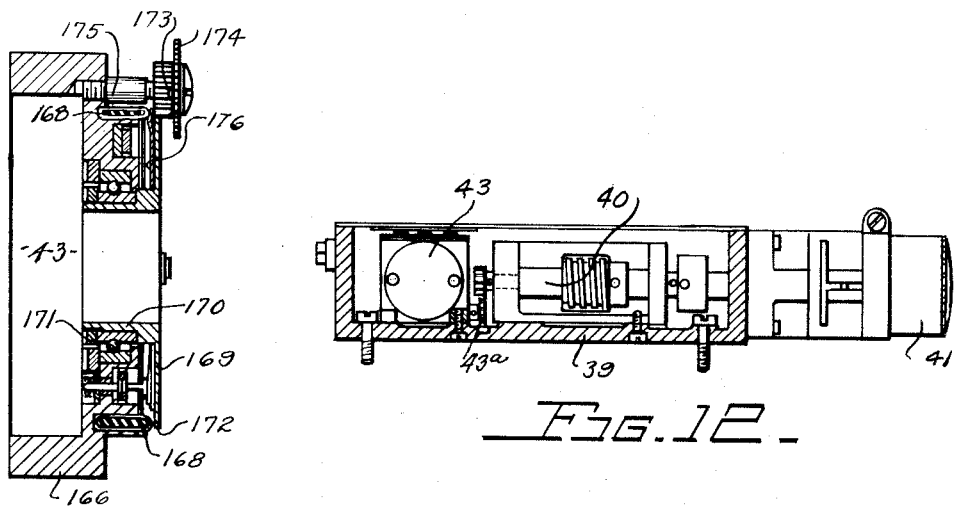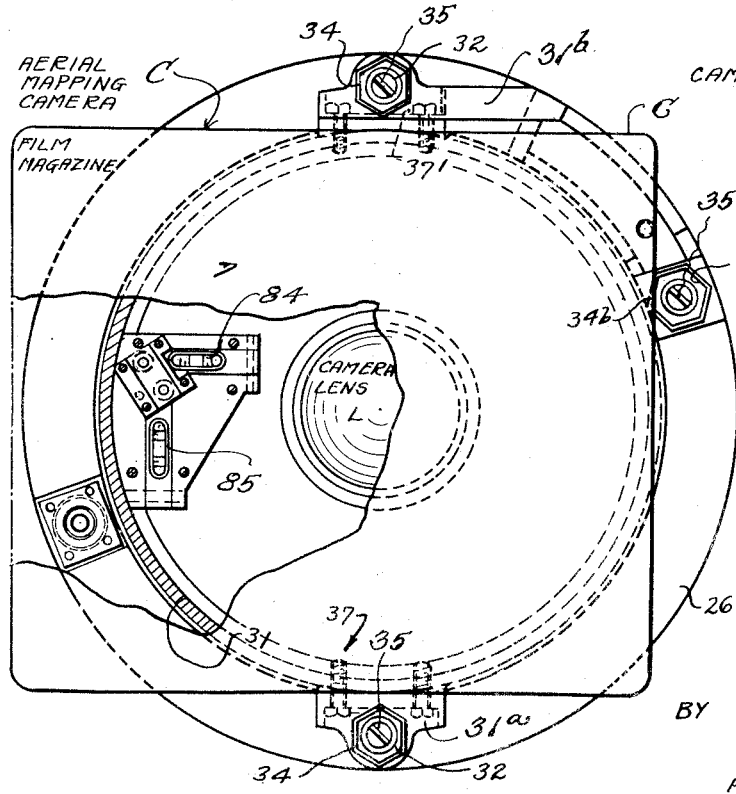

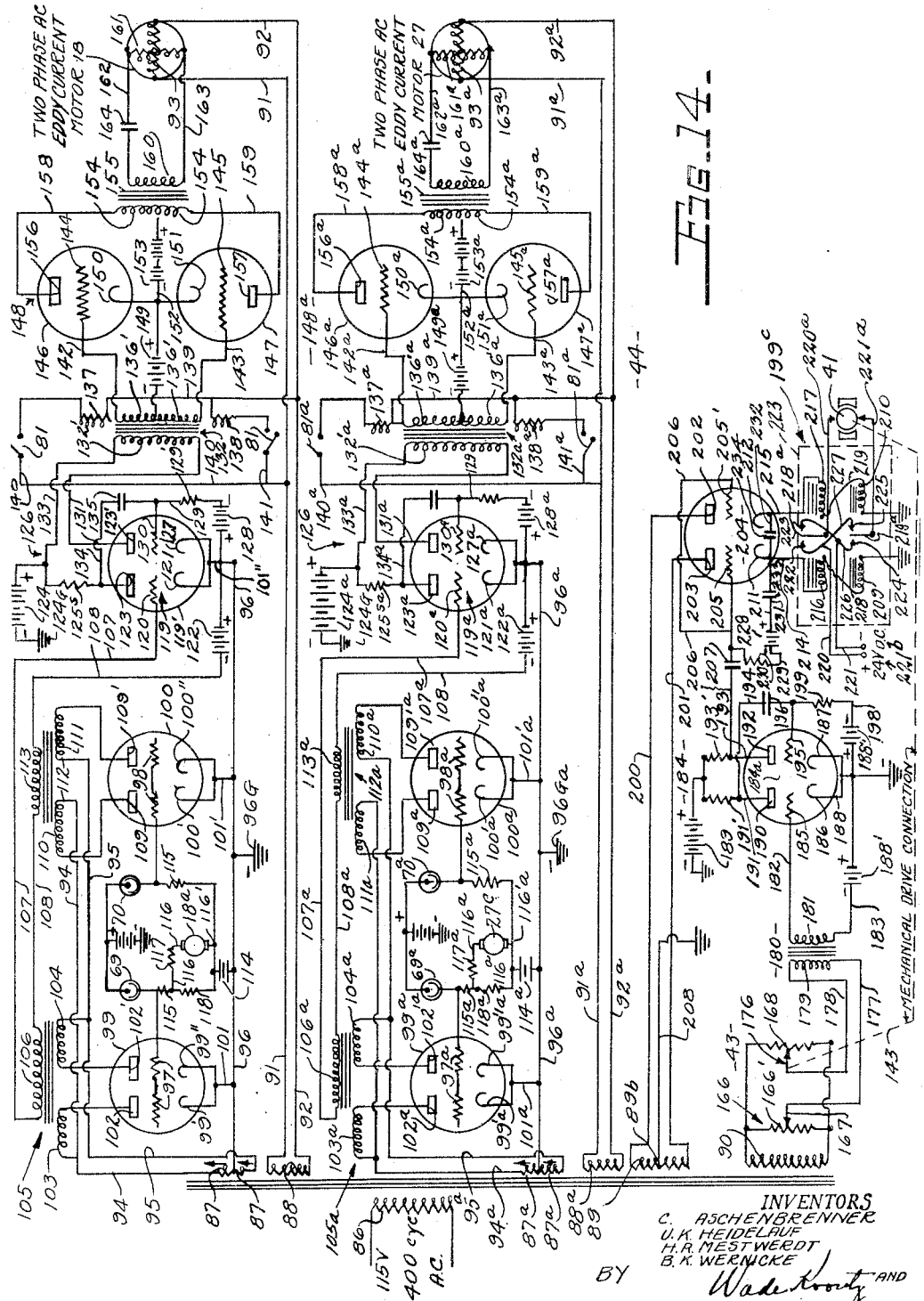

Patented Sept. 26, 1950

2,523,267

UNITED STATES PATENT OFFICE 2,523,267

GYRO-STABILIZED AERIAL CAMERA MOUNT

Claus Aschenbrenner, Malden, Mass., and Ulrich K. Heidelauf and Herman R. Mestwerdt, Dayton, and Bruno K. Wernicke, Trotwood, Ohio Application March 8, 1948, Serial No. 13,728

14 Claims. (Cl. 318—19)

(Granted under the act of March 3, 1883, as amended April 30, 1928; 370 O. G. 757)

The invention described in the following specification and claims may be manufactured and used by or for the Government for governmental purposes, without the payment to us of any royalty thereon.

This invention relates to stabilized supporting means and more particularly to gyroscope stabilized camera supporting and leveling apparatus, primarily employed in the stabilizing and leveling of aerial mapping cameras and other apparatus on aircraft while in flight with respect to a vertical reference.

An object of the present invention is the provision of extremely sensitive, light and compact gyroscopically controlled, electronically actuated leveling means for platforms or similar supports on which aerial mapping cameras and similar precision apparatus are mounted.

A further object is the provision of an electrically controlled platform leveling apparatus employing a gravity erected gyroscope for a vertical reference member in which no torque is applied to the vertical reference member or gyroscope during the leveling action to disturb the position of the vertical reference member or precess the gyroscope incident to the leveling action.

A still further object is the provision of apparatus for stabilizing aerial mapping camera-supporting platforms, under the control of a gravity erected gyroscope vertical reference member, in which rotary leveling means are provided for leveling the platform in transverse intersecting vertical planes, the rotary leveling means having minimum inertia, and including dampening control means actuated by the rotary leveling means for exerting a dampening control action on the rotary leveling means in a predetermined ratio to the rate of rotation of the rotary leveling means.

A further object of the present invention is the provision of a support having a camera leveling mount or platform thereon with an electrically operable means for leveling the platform, including photocell and light-beam projecting means on the platform having vertical reference means for displacing a light beam from the light-beam projection means incident to relative tilting displacement between the platform and the vertical reference means, in which minimum displacements between the platform and the vertical reference means produces maximum displacements of the light beam relative to the photocell means.

A still further object is the provision of an improved photocell and a gyroscope having a vertical reference axis for determining the level position of an aerial camera mount, including light beam projection means on the mount and light beam reflecting means on the camera mount maintained in a plane normal to the vertical reference axis of the gyroscope, in which flat wide beams of light are projected onto the reflecting means in transverse intersecting substantially vertical planes and reflected onto photocell devices which are disposed on the mounts in said intersecting planes at opposite sides of the median planes of the flat light beams, together with light concentrating means located at each side of the median planes of the light beams, when the platform is level and the vertical reference is vertical, for concentrating the light received by each light concentrating means on the respective photocell devices at the opposite sides of the median plane of the light beam, and including reversible motor driven leveling means for leveling the platform having electronically amplified control circuits connected between said photocell devices and the motor driven leveling means for selectively energizing the motor in one direction or the other in predetermined ratio to the light received by each of the photocell devices, together with electrical current generating means driven by the rotary leveling means for electronically controlling the rate of rotating of the rotary leveling means in a predetermined ratio to the rate and direction of rotation of rotary leveling means to produce a decelerating or dampening action on the rotary leveling means as the current supplied thereto under control of the photocell devices is reduced.

A still further object is the provision of a leveling platform apparatus for aerial mapping cameras and precision apparatus carried by the platform in which a vertical reference member on the platform and electrical power operated leveling means for leveling the platform are provided, the leveling means being responsive to angular displacements between the platform and the vertical reference member to level the platform with respect to the vertical reference member, including electronically controlled dampening means for damping the leveling action of the platform in a predetermined ratio to the rate of operation of the electrical power operated leveling means.

A still further object is the provision of an aerial mapping camera supporting platform in which improved leveling adjustment means are provided between the leveling platform and the camera mounted thereon whereby the camera or other apparatus carried by the platform may be easily, conveniently, and positively adjusted in transverse intersecting vertical planes relative to the position of the leveling platform, and adjusted in azimuth independently of the azimuth adjustment of the platform.

A further object of the invention is the provision of light beam and photocell electronically controlled leveling control means employing two inclined flat wide rectangular beams of light, projected in transverse intersecting vertical planes, with a tiltable mirror disposed horizontally in the path of said light beams for reflecting and displacing each of the light beams in the transverse intersecting vertical planes in a predetermined direction and ratio to the relative direction and ratio of relative displacement between the horizontal mirror and the camera leveling support in the aforesaid vertical intersecting planes, including two pairs of side-by-side elongated parallel positive lens elements, preferably planoconvex cylindric lenses each pair being disposed with their adjacent longitudinal edges in one of the median planes of the reflected light beams when the support is level and the mirror is horizontal, together with a pair of photoelectric cell elements for each light beam, located in the aforesaid vertical intersecting planes, each pair of photoelectric cell elements having electronically amplified operating circuits connected to the photocell devices in that plane to be selectively energized in a predetermined ratio to the displacement of the reflected light beam in that plane.

A further object is the provision of improved camera supporting and leveling means for aerial camera supporting platforms, having electronic control means for adjusting the platform, in "pitch" and "roll" planes of an aircraft carrying the camera, to a level position relative to a gravity vertical reference, including a pair of reversible eddy current leveling motors having a minimum degree of inertia and operatively connected to the supporting platform to tilt the platform relatively in the "pitch" and "roll" planes, together with light beam photocell control means for selectively controlling the direction and rate of operation of the eddy current motors in a predetermined ratio to the direction and degree of displacement of the platform from a level position, together with a reversible D. C. generator driven by each of the eddy current motors, for introducing an opposing or dampening electrical control potential in the photocell control means in proportion to the rate and direction of rotation of the eddy current motor means, to effect an electrical damping control action on the eddy current motors in predetermined ratio to the rate of operation of the eddy current motors to decelerate the speed of rotation of the eddy current motor means as the photocell controlled operating potential to the eddy current motors is reduced.

A still further object is the provision of an improved follow-up system for sensitive and follow-up elements carried on a support in an aircraft and sensitive to pitch, roll and azimuth movements of the aircraft, in which said sensitive element comprising a gyro vertical reference member on the follow-up element, the follow-up element being adjustable in pitch, roll and in azimuth, and comprising a gimballed supporting platform for an aerial mapping camera or similar precision apparatus, the platform having photoelectric cell and light beam electronic control means thereon for leveling the platform relative to the position of the gyro vertical reference member carried by the platform and including electrical dampening control means operable incident to the rate of leveling action of the platform to dampen the leveling action in a predetermined decreasing ratio, as the rate of leveling action decreases, to prevent the platform and the platform leveling control means from "hunting" or oscillating as the platform is maintained in level position.

Other and further objects and advantages of the invention will become more apparent from the following description taken in connection with the accompanying drawings in which like reference characters refer to like parts in the several figures.

*Drawings*

Fig. 1 is a top plan view of an improved camera leveling mount, illustrating the same positioned above an opening in the lower portion of the fuselage of an airplane, the camera being omitted.

Fig. 2 is a side elevation of the main frame of the leveling apparatus showing the same mounted on supporting brackets which are secured to the aircraft, and illustrating the cushioned securing means between the supporting bars which are secured to the aircraft, and the main frame of the leveling apparatus, the gimbal rings and certain parts supported thereby being omitted from this figure of the drawing. Parts are broken away and shown in section.

Figure 3 is an end view of the main frame showing the two gimbal rings in position, parts being broken away and shown in section.

Figure 6 is a top plan view of the improved photocell light beam projection control unit, illustrating a portion of the azimuth ring on which the unit is mounted, parts of the casing being broken away and shown in section to disclose the locations of the electronic amplifier tubes which are controlled by the photocells.

Figure 7 is a rear view of the photocell control unit, more clearly illustrating the preliminary leveling adjustment features.

Figures 8 and 9 are detail elevation and bottom plan views of one of the eddy current leveling motors, certain parts being broken away and shown in section in Figure 8.

Figure 10 is a sectional view through one of the eddy current leveling motors.

Figure 11 is a cross sectional view of the follow up control potentiometer for the azimuth motor follow up control circuit.

Figure 12 is a detail view of the azimuth motor arrangement.

Figure 13 is a detail view of the supporting platform or ring, diagrammatically illustrating a mapping camera in position thereon, parts being broken away to more clearly illustrate the spirit levels for determining the preliminary adjustment of the camera ring to a level position.

Figure 14 is a schematic wiring diagram illustrating a wiring circuit for the leveling apparatus and disclosing somewhat simplified electrical and electronic control circuits.

Figure 15 is a vertical section more clearly showing how the camera supporting casing or ring is mounted on the azimuth ring and one of the three leveling jacks for leveling the camera with respect to the azimuth ring. One of the azimuth ring supporting bearings is also shown.

Figure 4:
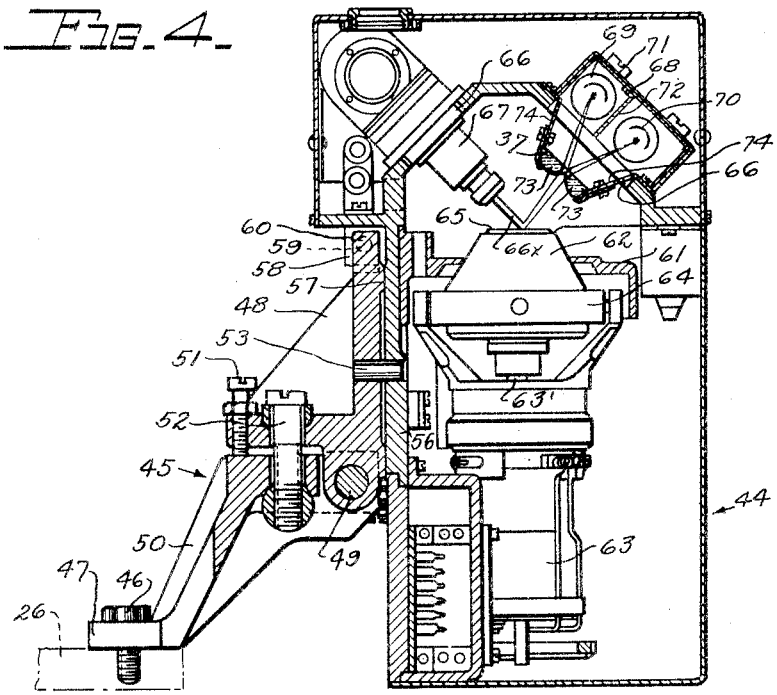
Figures 4 and 5 are vertical sectional views taken through the photoelectric cell and light beam projection unit, the gyroscope, mirror, and pendulous drive motor for the gyroscope rotor being omitted from Figure 5.

Referring more particularly to Figure 1 of the drawings, the reference numeral 1 indicates a lower portion of an aircraft fuselage having an opening 2 through the bottom thereof with brackets or supporting shelf members 3 at opposite sides of the opening, on which are mounted and secured by bolts 6, 6 a pair of laterally spaced, longitudinally extending supports or bearing arms 5. The opposite ends of each of the bearing arms or supports 5—5 as seen in Fig. 2 are recessed to receive shock and vibration absorbing supports or cushion members 7, each member 7 having a threaded extension which is secured in the bearing arm by a nut 8. The cushion member 7 includes an intermediate resilient portion 7' which is surrounded by a sleeve member 9 for limiting the degree of expansion of the resilient portion 7' incident to downward pressure applied to the upper end of the cushion member 7. The upper ends of the cushion members are reduced and threaded to form stems which are secured in suitable openings 10 formed in countersunk recesses 11 in a somewhat rectangular shaped main or supporting frame 12. The frame 12 resting on the resilient cushions 7 in parallel relation to the bearing arms 5, is secured to the supporting bearing arms through the cushion members 7 by the clamping nuts 13—13.

Depending bracket arms or hanger members 14—14 are secured to the inner portion of the supporting frame 12 in diametrically opposite relation, the lower ends of these hangers being provided with inwardly extending trunnion members 15—15. An outer gimbal frame 16, as seen in Fig. 1, is journalled at its opposite sides on the trunnion members 15—15 in suitable antifriction bearings 17—17, shown in detail in Fig. 3, permitting tilting displacement of the outer gimbal frame 16 about an axis transverse to the longitudinal axis of the rectangular frame 12, the tilt axis of the outer gimbal frame being preferably disposed perpendicular to the longitudinal axis of the aircraft carrying the leveling device. The outer gimbal frame 16 is somewhat D shaped in form, as best seen in Fig. 1, having an end portion 16a extending parallel to the end portion 12a of the main supporting frame 12.

A two-phase eddy current motor, indicated generally at 18 in Figure 1, and shown in detail in Figs. 8 to 10 and later described in detail, is rigidly secured by a bracket 18' fastened at 18'' to the gimbal frame 16. The motor 18, through a reduction gear train 19, drives a worm or screw shaft 20 on which is threadably secured a traveling nut 21. The nut 21 is slidably received in a yoke member 22, journalled in suitable bearings 23, located in the rectangular frame 12, as seen in Figs. 1 and 8. Rotation of the screw shaft 20 by eddy current motor 18 causes the gimbal frame 16 carrying the eddy current motor 18 to be tilted about the axis of the trunnion members 15, 15.

Journalled within the outer gimbal frame 16 on a tilt axis transverse to the tilt axis of the outer gimbal frame is an inner gimbal frame 24 with supporting bearings at the opposite sides, indicated at 25. This inner gimbal frame 24 as best seen in Figure 15 constitutes a camera supporting platform or sensitive supporting element on which an aerial mapping camera C or other apparatus is adapted to be mounted. The inner gimbal ring or camera supporting platform 24 carries an azimuth mounting ring 26, rotatably journalled thereon for movements in azimuth on suitable antifriction bearings 26'. Separate electric motor control means are provided, later to be described, for adjusting the position of the mounting ring 26 in azimuth.

A second, two-phase eddy current leveling motor 27 is mounted on the outer gimbal frame 16 as seen in Fig. 1, and is similar in construction to the first mentioned eddy current motor 18. The eddy current motor 27, through a suitable gear reduction train, drives a worm or screw shaft 27a with a traveling nut thereon similar to the nut 21, slidably engaging a shifter yoke member 28 that is journalled in suitable bearings on the inner gimbal frame or supporting platform 24. Rotation of the motor 27 actuates the nut to tilt the inner gimbal frame relative to the outer gimbal frame 16 on its bearings 25 about an axis perpendicular to the tilt axis of the outer gimbal frame 16.

The azimuth mounting ring or platform support 26 is provided on its upper surface with two sets of threaded holes 29—29 and 29a. Adjustable seats or sliding supporting plates 30 and 30a are provided for supporting a mapping camera or other conventional precision apparatus on the azimuth mounting ring with its film axis in accurate longitudinal alignment with the longitudinal axis of the rectangular frame 12 and constitute seating means for the adjusting means for adjusting the level of a camera C or apparatus to be carried by the ring 26. The holes 29—29 and surrounding plates 30—30 are normally disposed in a plane passing through the tilt axis of the inner gimbal ring or frame 24, while each of the other holes 29a—29a and adjustable plates 30a—30a are equally spaced, circumferentially, around the ring 26 in the same direction from each of the holes 29 and plates 30 for reasons later to be described.

The mapping camera C is mounted on an annular ring or casing member 31 of substantially the same diameter as the inner opening in the supporting or azimuth ring 26. This mounting ring 31 is shown in Fig. 13 and is provided with two diametrically opposite supporting brackets 31a and 31b having threaded holes 32, each receiving a supporting jack screw member 34. Each jack member 34 as best seen in Figure 15 is formed with a spherical bearing head 34a at its lower end adapted to seat in one or the other of the spherically socketed slidably adjustable plates 30 or 30a which are retained on the azimuth ring 26 in diametrically opposite relation. This arrangement positions the camera with the longitudinal axis or movement of the film always fixed relative to the position of the azimuth ring 26, since either of the supporting jack screws 34 may be adjusted independently, the camera C can be conveniently levelled or adjusted to dispose the focal plane parallel to the plane of the inner gimbal ring 24 or azimuth ring 26, and the longitudinal film axis in a plane parallel to the longitudinal axis of the main frame 12. Tightening of securing bolts 35 secures the camera supporting brackets 31a, 31b in a fore and aft level adjustment with respect to the azimuth ring 26. The supporting jack screw 34b seats in one or the other of the recessed plates 30a, permitting the camera casing or ring 31 to be secured on the azimuth ring 26 with the direction of film movement in either of two directions which are 180° apart. Adjustment of the screw 34b and tightening of the securing bolt 35 permits the camera casing ring 31 and a camera thereon to be leveled and secured in a transverse plane, thus permitting the axis of the lens L of the camera to be adjusted to a vertical position in two transverse intersecting planes relative to the azimuth ring 26 when the azimuth ring is in stabilized position. The bolts 35 pass through the hollow jack screws 34 and 34b and are provided with slotted heads which engage the upper ends of the jack screws. The ends of the bolts 35 extend through central apertures in the plates 30 and 30a so that tightening of the bolts 35 securely seats the spherical ends 34a of the jack members in the spherical depressions of the plates 30—30a. The camera mounting ring 31 is provided with camera supporting brackets 31a, 31b secured on the exterior of the ring 26 in diametrically opposite relation by fastenings 37.

Figure 16:
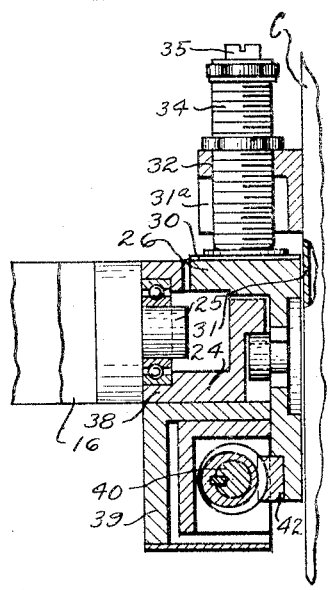
Figure 16 is an enlarged fragmentary vertical sectional view taken on a vertical plane passing through the adjustment means for rotating the azimuth ring, showing a portion of the camera ring or casing and one of the adjustable camera supporting jack screws.

The azimuth camera mounting platform or azimuth ring 26 is adjusted in azimuth in the inner gimbal ring 24 to position the camera so that the pictures taken thereby will be oriented in the same direction as the "ground track" of the aircraft regardless of cross winds and drift conditions. Projecting from the lower edge of the inner gimbal ring 24 is a supporting bracket or plate extension 38 on which the adjusting mechanism for the azimuth ring 26 is mounted. This mechanism is best disclosed in Figure 16 and is enclosed in a casing 39, secured on the bracket 38, the mechanism comprising a worm shaft 40 journalled in the casing 39 and driven by a reversible D. C. motor 41 through a suitable coupling member, the worm element on the worm shaft 40 being disposed in meshing relation with a worm segment 42 projecting from a peripheral flange on the azimuth ring 26. Rotation of the motor 41 in one direction or the other rotatably adjusts the azimuth ring 26 within the inner gimbal member 24.

Secured in one end of the casing 39 is a follow-up control device for the azimuth motor 41 as indicated at 43. The follow-up control device is driven by the worm shaft 40 through a reduction gear train 43a and includes a potentiometer which is electrically connected to rebalance the azimuth motor control circuit, later described, as the azimuth ring 26 is rotated. A previous unbalancing of a bridge control circuit to the motor 41 by the manipulation of a manual operable azimuth control potentiometer initiates the azimuth adjustment.

Figure 5:
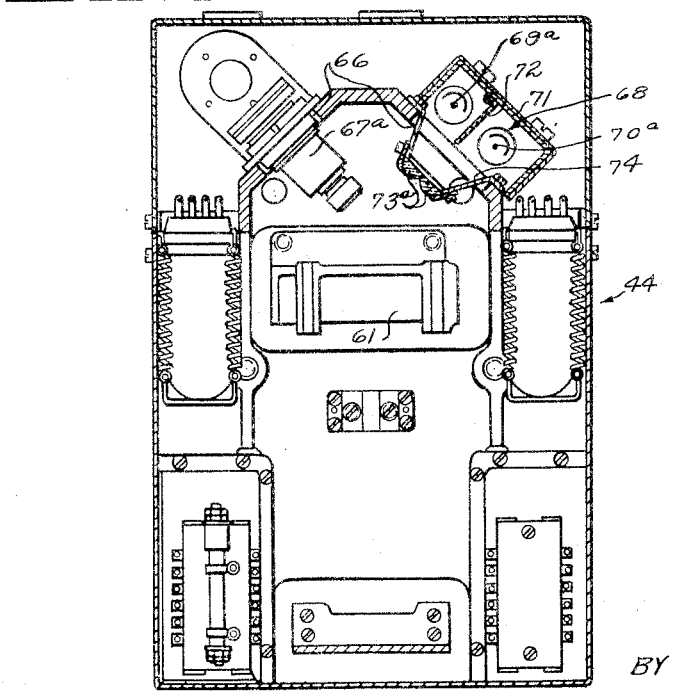

Mounted on the azimuth ring or platform 26 is a photoelectric cell and light beam control unit indicated generally at 44 and best seen in Figs. 4 to 6. The control unit 44 is carried by an adjustable two part bracket 45, rigidly secured to the azimuth ring by screw fastenings 46 passing through the bracket flange 47 and threaded in suitable openings in the azimuth ring. The bracket 45 includes an upper adjustable portion 48 horizontally pivoted at 49 to a lower bracket portion 50, a set screw 51 being provided in the upper bracket portion for adjusting the position of the upper portion 48 in a vertical plane, and the photocell and light beam projection unit 44 carried thereby. A bolt 52 is provided to draw the set screw member 51 into securing relation against the lower bracket portion 50, rigidly securing the upper and lower portions of the bracket in their adjusted positions.

The photoelectric cell and light beam projection control unit 44 is also rotatably adjustable about a pivot or dowel pin 53 in a plane transverse to the axis of the horizontal pivot connection 49. Securing bolts or screws 54 as best seen in Fig. 7 extend through arcuate slots 55 in the upper bracket portion 48, the radius of curvature of the slots having a common center located at the axis of the dowel pin 53. The bearing plate or face 56 of the photocell unit 44 is secured against a face plate 57 formed on the upper portion 48 of the bracket 45. The portion of the bearing plate 56 which is located above the bracket member 45 is provided with spaced integral lugs 58, having axially aligned adjusting screws 59 threaded therein and extending toward each other into engagement with the opposite faces of a lug 60 that projects upwardly from the upper edge of the bracket 45. When the two clamping screws 54 are loosened, the two adjusting screws 59 may be rotated to positively adjust the photocell unit 44 in a plane normal to the axis of the dowel pin 53 and perpendicular to the plane of adjustment of the upper bracket portion 48 about the axis of the pivotal connection 49.

The photoelectric cell and light beam projection leveling control unit 44, as seen in Figs. 4 to 6, includes a gyroscope and two sets of photocell and light beam control elements. Secured to the bearing plate 56 of the control unit 44 is a bracket member 61, on which is mounted a vertical reference member, arranged for tilting displacement in transverse intersecting planes, the vertical reference member comprising a balanced gyroscope rotor 62 with means for erecting the spin axis of the rotor to a true vertical reference axis, the erecting and supporting means for the rotor 62 being a gravity operated vertical or pendulous member 63 suspended from the gimbals 64. The gravity operated vertical reference member 63 includes an electric motor having a drive shaft 63' which terminates in a ball shaped head at the gimbal tilt axis and the gyroscope rotor 62 supported on this head, an inverted V-shaped opening being formed in the central portion of the underside of the rotor engaging the ball-shaped head on the end of the motor drive shaft and constituting a frictional driving means between the motor drive shaft 63' and the gyroscope rotor 63 and also constituting frictional erecting means for the spin axis of the gyroscope rotor 62. Centrifugally releasable drive means are provided between the rotor 62 and the motor drive shaft for initially providing a high driving torque relation between the motor shaft 63' and the rotor 62 until the rotor is accelerated substantially to the maximum speed, after which the centrifugal clutch automatically is released, permitting the rotor to be driven solely by frictional contact between the ball element on the end of the motor shaft and the sides of the inverted V-shaped supporting recess in the under side of the rotor. When the rotor 62 tilts relative to the axis of the motor drive shaft an unequal application of the motor driving torque is frictionally applied to the sides of the V-shaped opening in the rotor, producing a corresponding precession and erection of the spin axis of the rotor 62 to the vertical reference axis of the motor drive shaft 63'. The exterior surface of the rotor 62 is tapered upward as shown in the drawings, its top surface being provided with a circular optical flat and light reflecting surface in the form of a mirror 65, secured in a plane perpendicular to the rotor spin axis.

The upper portion of the bearing plate 56 of the control unit 44 is somewhat dome shaped, having a substantially truncated, four-sided, pyramidal form with an opening 66 through each of the four inclined walls, the openings 66 being in two transverse vertical planes intersecting each other at the tilt axis of the rotor, one of these planes extending through the spin axis of the rotor at its tilt axis and through the center of the azimuth ring 26, in other words in the plane of "pitch" of the aircraft carrying the device. The other intersecting plane passes through the other two openings 66 and is, of course, perpendicular to the first mentioned plane, intersecting same at the tilt axis of the rotor 62, and is in the "roll" plane or axis of the aircraft.

A light beam projection device 67 and 67a is secured in one of the openings 66 in each of the aforesaid intersecting planes, having a light projection axis $66^x$ which inclines downwardly toward the center of the mirror 65, when the mirror is level and the azimuth ring 26 is level with the photographic axis L of the camera C in a vertical position. Each light beam projector includes means for projecting a beam of light in a substantially flat wide and rectangular form, onto the surface of the mirror 65 at an angle of incidence of about forty-five degrees, the beams of light striking the mirror surface approximately at the spin axis of the rotor in the aforesaid intersecting planes. In each of the aforesaid intersecting planes is a pair of photoelectric cell devices, indicated generally at 68, the photocell devices each comprising a pair of photoelectric cells 69 and 70, and 69a and 70a, disposed in spaced parallel side-by-side relation at opposite sides of the median plane of each of the reflected light beams, when the mirror 65 is level and the supporting platform or azimuth ring 26 is level. Each pair of the photoelectric cell devices are connected to leveling control circuits, later to be set forth, for controlling the rate and direction of rotation of the eddy current leveling motors 18 or 27 in order to correct the "pitch" and "roll" movements of the main frame 12 and maintain the camera in level position. A small casing 71 surrounds each pair of photocell elements 69 and 70, and 68a and 70a, with a baffle plate 72 disposed between each pair of photoelectric cell elements.

Elongated, positive, or plano-convex-cylindric lens elements 73—73 and 73a—73a are disposed, one in front of each of the photoelectric cells 69 and 70 and 69a and 70a, the spaced relation of the lens elements from the cathodes of the photoelectric cells 69 and 70 (69a and 70a) being substantially equal to the focal length of the cylindric lens elements. These lens elements are secured in the hood portion of the unit 44 by supporting arms 74 which extend through the openings 66. The adjacent edges of each pair of lens elements 73 lie in juxtaposed relation to the median plane of the projected light beam $66^x$ when the supporting platform 26 and the reflecting surface of the vertical reference member 62 are in predetermined relative level reference positions.

The cathodes of the photoelectric cells 69 and 70 associated with each of the cylindric lens elements 73—73 and of the photocells 69a and 70a associated with lens elements 73a—73a are elongated, each disposed substantially at the focus of the cylindric lens element, the elongated concave cathode element being provided in each photocell element behind an equally elongated anode, so that reflected light beams from the mirror 65 passing through either of the cylindric lens elements will be concentrated onto the cathode elements of the respective photocells.

The two projected and reflected light beams are flat, rectangular, comparatively wide and thin, having a median plane which normally passes through the juxtaposed edge portions of each pair of the side-by-side cylindric lenses 73, 73, and therefore when the wide and relative thin beam of light is concentrated on each of the photocell cathodes a minimum displacement of the light beam transverse to its median plane, due to slight relative tilt of the gyroscope reflecting mirror 65, causes a maximum change in the ratio of light concentration on the two photoelectric cells 69 and 70 or 69a and 70a in that tilt plane to occur. A suitable slit shaped aperture or reticule plate is provided between the lens elements and the light source of the projection device 67, this plate being provided with a narrow elongated rectangular transparent slit. The lens of the projection device 67 produces a sharp image of this slit in the plane of the dividing cylindric lenses 73, 73.

Located within the photocell light beam unit 44, and connected to each of the photocells 69, 70, 69a, 70a, is a dual cathode, plate and grid (three element) vacuum tube 99, 100, 99a, 100a, each plate thereof being connected to one end of the primaries 103, 104 or 110, 111 of one of the phasing transformers 105, 112, or 105a, 112a, disclosed more clearly in the simplified wiring diagram illustrated in Fig. 14. The plates 102, 102' and 109, 109' of the tubes 99 and 100 are each connected to one end of one of the reversely wound primaries 103, 104 or 110, 111 of a pair of phasing transformers 105, 112 while the grid elements 97, 98 of the tubes 99, 100 are connected to the curved cathodes of the photoelectric cells 69 and 70.

The outputs of the secondaries 106 and 113 of the two phasing transformers 105 and 112 associated respectively with the photoelectric cells 69 and 70, are connected in series in opposition to each other to an intermediate amplifying state, and induce an alternating current potential, varying in amplitude and phase, depending upon the relative degree of illumination of one or the other of the photocells 69, 70 or 69a and 70a, incident to the amount of deflection of the light beam onto one or the other of the adjacent cylindric lens elements. This electrical output controls the rate and direction of rotation of one of the eddy current leveling motors 27 or 18 depending upon which photoelectric cells are excited to the greater extent by a change in deflection of its associated light beam.

Referring to Figs. 1, 8 and 9, the respective eddy current motors 18 and 27 each drive one of the D. C. generators 18a and 27c through suitable reduction gearing 19b. The electrical output from each of the D. C. generators 18a and 27c is connected to the grid and cathode elements of at least one of the vacuum tubes 99—100 (or 99a—100a), thereby impressing a variable positive or negative current potential on the grid of that vacuum tube, depending upon the rate and direction of rotation of the respective eddy current motors. This produces an electrical dampening control effect on the eddy current motor circuits for quickly decelerating the speed of the eddy current motors when a reduction in the current supplied to the eddy current motor under the control of the photoelectric cell devices takes place. As the eddy current motor decelerates, the electrical output from the D. C. generator correspondingly decreases and the dampening control effect is correspondingly reduced. The eddy current motors 18 and 27, and the D. C. generators, 18a and 27c driven thereby, as well as the drive gearings between these motors and the generators, are similar. It is essential that the inertia of the rotating parts of the eddy current motors be as low as possible. The reference numeral 76 in Fig. 10 indicates the casing of one of the two phase A. C. eddy current motors, the motor having a drive shaft 76a on which is secured an armature 77, in the form of a thin aluminum cup. This armature is rotatable between the inner and outer laminated cores 78, 78', the field windings thereof being disposed in a ninety degree out-of-phase relation, one of these fields being supplied with an A. C. potential from the same A. C. power source or transformer that supplies the A. C. potential to the phasing transformers 105—112 previously referred to, while the other field of each eddy current motor is supplied with an A. C. potential varying in magnitude and phase as the degree of conductivity of one or the other, or both of the two photoelectric cells is changed.

Limit switches 81—81 and 81a—81a are provided respectively between the main frame 12 and the outer gimbal frame 16, and between the outer and inner gimbal frames 16 and 24 for respectively limiting the tilting action between the main frame 12 and the camera supporting platform 26 in transverse planes thus limiting the degree of tilting action between the azimuth ring 26 and the main frame 12 in "pitch" and in "roll." The limit switches are all preferably microswitches of the normally open type, the switches 81a—81a being secured to the outer gimbal frame 16 at opposite sides of the inner gimbal frame tilt axis, suitable actuating arms 81b—81b project from the inner gimbal frame to positions for selectively engaging and closing one or the other of the microswitches incident to a predetermined degree of tilt of the inner gimbal frame relative to the outer gimbal frame. The other microswitches 81—81 are secured in superimposed relation on the outer gimbal frame 16 between a bifurcated actuating arm 81c, secured to the main frame 16 at one side of the outer gimbal frame tilt axis. In the arrangement disclosed in the drawings the limit switches 81 and 81a are selectively closed by a predetermined degree of tilt of the ring 26 in "pitch" and in "roll" and respectively control the energizing of electrical "bucking" coils which oppose further continued operation of the respective eddy current leveling motors 18 and 27. This arrangement is schematically illustrated in the wiring diagram shown in Fig. 14. In practice four hundred cycle 115 v. A. C. eddy type servomotors are employed, and the A. C. source is 400 cycles at about 115 v.

The camera mount is preferably provided with suitable quick "disconnect" gang terminals and manual adjustment controls, multistage amplifiers, D. C. current supply means, such as conventional inverters, as well as intervalometer controls for the operation of the camera, all mounted in the aircraft carrying the device and connected to the apparatus of the subject invention through the quick "disconnect" terminals just referred to.

The quick "disconnect" gang terminals and the distributor locations are indicated at 82 having multicable conduits 83 leading therefrom to the respective electrical elements carried by the inner and outer gimbal rings 24 and 16, suitable channels being formed in the parts for accommodating these conduits, as well known in conventional electrical wiring practice. No particular reference is made to the specific manner in which these conduits are secured in and to the various elements of the apparatus other than to indicate that they must be flexible where relative movements between the parts take place, such as the relative tilting movements between the gimbal frames 16 and 24 and the main frame 12, and to permit relative azimuth adjustment of the azimuth ring 26 and adjustment of the photoelectric cell unit 44 relative to the ring 26 on which it is mounted. The simplified schematic wiring diagram, later referred to, should make these conventional connections clear and understood by any one skilled in the art to which the invention appertains.

Located on the camera casing ring assembly 31 as seen in Fig. 13 are two spirit level indicators 84 and 85. These levels are secured in perpendicular relation to the photographic axis of the camera or lens axis L and perpendicular to each other. When the camera is mounted on the main frame, the levels are preferably disposed in "pitch" and "roll" planes of movement of the aircraft.

Since the photoelectric cell control unit 44 is capable of adjustment on the azimuth ring 26 in "pitch" and "roll" directions, as above pointed out, and since the camera casing 31 is independently adjustable relative to the azimuth ring 26 in "pitch" by manipulation of the two fore and aft supporting jack screws 34, and in "roll" by the adjustment of the offset jack screw 34b, as before set forth, it should be understood that the azimuth ring or supporting platform 26 can be accurately leveled by adjustment of the photoelectric cell gyroscope control unit 44 thereon, and the camera itself can be independently adjusted by leveling the camera casing 31 through adjustment of the jack screws 34 and 34b while observing the positions of the bubbles in the spirit levels 84 and 85 to thereby dispose the camera axis L in a true vertical position. This latter adjustment can be made even though the azimuth ring 26 is stabilized in a slightly out-of-level position, but it is preferable to adjust the azimuth ring to a true level position and then level the camera on the azimuth ring by means of the spirit levels and jack screws 34 and 34b.

In Fig. 14 a simplified schematic wiring or circuit diagram for the camera leveling apparatus is disclosed. In actual practice the control circuit of a somewhat more complicated type including conventional multistage electronic amplification, smoothing circuits for operating the eddy current leveling motors 18 and 27 and the azimuth motor 41, also protective fuse control devices and other conventional adaptations are employed, which are all well known to those skilled in the art to which the invention appertains and therefore not specifically included in the circuit diagram. The wiring diagram in Fig. 14 also discloses, for simplicity, the use of batteries as a source of D. C. voltage instead of conventional rectified electric power sources which are usually employed.

Each of the eddy current leveling motors 18 and 27 for effecting leveling movement of the camera supporting platform or azimuth ring 26 in "pitch" and in "roll" is controlled by one pair of the photoelectric cell elements 69, 70 or 69a and 70a, the electrical control circuits for effecting these two transverse leveling actions being substantially identical in arrangement and operation. Similar reference characters will therefore be used on both of the photoelectric cell control circuits as disclosed in Fig. 14 except that the exponent "a" is added to the reference characters which are applied to the second or "roll" leveling circuit. Only the "pitch" leveling circuit will be specifically described employing reference characters which omit this exponent "a." This description will therefore apply to the second or "roll" leveling control circuit if it is observed that similar parts are indicated in both "pitch" and "roll" circuits by similar reference numbers with the exception that certain detail elements previously referred to by entirely different reference characters are referred to in the "roll" circuit by their original reference characters, such as the reference to the eddy current leveling motors 18 and 27 and the D. C. generators 18a and 27c driven thereby. For example, in the "pitch" or fore and aft leveling control circuit the two side-by-side photoelectric cell elements are indicated at 69 and 70 for selectively receiving the flat concentrated light beam from the light source 67 and the eddy current leveling motor is indicated at 18, having a D. C. generator 18a driven thereby while in the second or "roll" leveling control circuit the two side-by-side photoelectric cells are indicated at 69a and 70a for selectively receiving the wide reflected and concentrated beam of light from the light source 67a through the lens elements (73a—73a in Fig. 5). The reference numeral 86 in Fig. 14 indicates the primary of a power transformer having a predetermined A. C. voltage impressed thereon, for example, 115 volts, 400 cycles. This transformer is provided with center tap secondaries 87 and 87a, supplying electric energy to the "pitch" and to the "roll" photoelectric cell elements 69 and 70, and 69a and 70a. The primary 86 also induces electric energy in the secondaries 88, 88a, the center tap secondary 89, and the secondary 90, respectively, supplying current to one phase of each of the eddy current motors 18 and 27, operating the azimuth motor relays, and for supplying an electrical energy to the azimuth adjustment control circuit. The secondaries 88 and 88a, respectively, are connected to one phase of each of the eddy current leveling control motors 18 and 27 through conductors 91 and 92, and conductors 91a and 92a, these phases of the eddy current motors being indicated at 93 and 93a.

A pair of conductors 94 and 95 are connected to the opposite ends of the center tap secondary 87, while the center tap of this secondary is connected to a conductor 96. As before indicated the photoelectric cell units 69 and 70 are each provided with an anode and a curved plate cathode, these cathodes being respectively connected to the grid elements 97 and 98 of the vacuum electronic tubes 99 and 100, the tubes 99 and 100 being provided with cathodes 99' and 99'', and 100' and 100'', connected respectively to the conductor 96 through 101 and 101'. The pates 102 and 102' of the tube 99 are connected respectively to the adjacent ends of the opposing primaries 103 and 104 of the phasing transformer 105, this transformer having a secondary 106 connected at its opposite ends to conductors 107 and 108. The plates 109 and 109' of the tube 100 are respectively connected to the remote ends of a second pair of oppositely wound primaries 110 and 111 of a second phasing transformer 112 having a secondary 113, connected in series with the secondary 106 by the conductor 108. The adjacent ends of the phasing transformer primaries 110 and 111 are connected respectively to the conductors 94 and 95.

From the above it will be clear that when one or the other of the tubes 99 or 100, or tubes 99a or 100a, is conducting, a one-half wave potential is introduced in each of the primaries 103 and 104 of the transformer 105, or in each of the primary coils 110 and 111 of the transformer 112 (or in each of the primary coils 103a and 104a or 109a and 110a, respectively of the transformers 105a or 112a). Since the primaries 103 and 104 of the transformer 105 are connected to the tube 99 to pass current in one direction only, while the primaries 110 and 111 of the transformer 112 are wound and connected through the conductors 94 and 95 to the tube 100 to allow current flow in one direction only, the induced electrical potential in the conductors 107 and 108 (or 107a—108a) will be an alternating current, the phase of the current being determined by which one of the tubes 99 or 100 (or 99a or 100a) is conducting. If both tubes 99 and 100 are equally conductive the current potential induced in the conductors 107 and 108 by the two secondaries 106 and 113 will be equal and of opposite phase and the output therefor be zero. A fixed grid bias source 114 is provided, including fixed resistors 115 and 118 establishing a conventional negative bias on the grids 97 and 98 respectively, of the vacuum tubes 99 and 100.

The D. C. generator 18a, before referred to, which is driven by the "pitch" control leveling motor 18, has its electrical output connected through conductors 116 and 116' to the grid and cathode elements of at least one of the two dual tubes 99 and 100, resistor 117 and the resistor 118 being interposed between the connected tubes and the D. C. generator, so as to determine the potential impressed on the grid of the connected tube, depending upon the rate and direction of rotation of the D. C. generator 18a, which in turn depends on the rate and direction of rotation of the eddy current leveling motor 18.

The conductors 107 and 108 are connected to an intermediate electronic amplifying stage, indicated generally at 119, the conductor 107 being connected to the grid element 120 of the vacuum tube while the conductor 108 is connected to the cathode elements 121 and 127. A predetermined negative bias is imposed on the grid 120 through the conductors 108 and 107 by a D. C. source indicated at 122. This intermediate amplifying stage 119 is conventional, the plate 123 of the vacuum tube 119' being connected to the positive side of a D. C. source such as the battery 124 with a resistor 125S interposed in the circuit, the other side of battery is grounded at 124G. The conductor 96 as illustrated is connected to both cathodes 121 and 127 of the amplifier tube 119' the conductor 96 being connected to the negative terminal of the battery 124 through the ground connections 96g; the fixed resistor 125S is interposed between the plate 123 of the tube 119' and the positive side of the power source or battery 124.

A simplified form of comparative voltage amplifier is disclosed at 126 including the vacuum tube 119', the second cathode 127 being connected to ground through connection 96g and through 101'' and to the positive side of the battery 128, the negative terminal of the battery 128 being connected through a conductor 129 to the grid 130 of the tube, a fixed resistor 129' being interposed in the conductor 129. A conductor 131 connects the plate 123' to one end of a primary 132' of a transformer 132 in the usual manner, the other end of the primary 132' being connected by a conductor 133 to the positive terminal of the battery or D. C. power supply 124. The grid 130 of the vacuum tube 119', and the plate 123 are connected together by a conductor 134, having a condenser 135 interposed therein, in the conventional manner.

The transformer 132 has a center tap secondary 136'—136' and in addition each end of the secondary 136'—136' is wound with one of a pair of opposing or "bucking" coils 137 and 138 with sufficient turns to oppose or "buck" the current potential induced in the associated one of the secondary coils 136' when the coils are energized. One end of each of the "bucking" coils 137—138 is connected by conductor 139 to the conductor 92, the other ends of the bucking coils 137 and 138 are connected to the conductor 91 by conductors 140 and 141, each of the conductors 140 and 141 having one of the normally open tilt limit or mocroswitches 81—81 therein, these switches are the "pitch" control limit switches previously referred to for limiting the degree of displacement in "pitch" of the azimuth ring 26.

The opposite ends of the center tap secondary 136'—136' are connected through conductors 142 and 143 to the grids 144 and 145 of the vacuum tubes 146 and 147, located in a final amplifying stage 148. A battery or D. C. source 149 is provided, connected at its negative terminal to the secondary of the transformer 132 intermediate the two secondary coils 136'—136'. The positive terminal of the bias battery 149 is connected to the cathodes 150, 151 of the tubes 146 and 147 by a conductor 152. The plate circuits for the tubes 146 and 147 include a D. C. power source or battery 153 connected at its negative terminal to the cathodes 150 and 151 through the conductor 152. The positive terminal of battery 153 is connected to a transformer 155 at the center tap, intermediate the primaries 154—154. The outer or opposite ends of the primary 154—154 are connected to plates 156, 157 of vacuum tubes 146, 147 by the conductors 158, 159 in the conventional manner.

The ends of the secondary 160 of the transformer 155 are connected to a second phase 161 of the two phase eddy current leveling motor 18 by conductors 162 and 163, this phase being displaced in a ninety degree out-of-phase relation relative to the first phase 93 by a condenser 164 which is interposed in the conductor 162 to shift the phase of the current from the transformer secondary 160 to a 90° out-of-phase relation with respect to the phase of the current from the transformer secondary 88.

A manual azimuth adjustment control potentiometer 166 is provided, having an adjustable contact or slider 167, which is adjustable between the ends of the potentiometer coil 166' to selectively adjust the azimuth position of the azimuth ring or camera supporting platform 26. The azimuth control circuit "follow up" or balancing potentiometer device 43, reference being also made to Figs. 11 and 12, comprises an insulating base mounted within the azimuth motor casing 39. A "follow up" potentiometer coil 168 is secured in an annular channel in the base in the conventional manner, a slider contact 176 being secured to an annular flange 169 formed on a rotatable center sleeve 170 which is suitably journalled in antifriction bearings 171. The periphery of the flange 169 is provided with gear teeth 172 meshing with a small gear 173 of a twin gear unit having a large gear 174 meshing with a reduction gear train 43a before referred to, driven by a gear fixed on the end of the azimuth motor shaft 40 carrying the worm gear before referred to. The twin gear unit 173, 174, is journalled for rotation on a standard 175 secured in the base of the potentiometer casing. Rotation of the azimuth motor 41 adjusts the slider 176 with respect to the ends of the potentiometer coil 168 until the bridge circuit to the azimuth motor polarized relay control devices is again balanced, causing the motor 41 to stop. Conductors 177 and 178 respectively connect the manual and "follow-up" slider contacts 167 and 176 to the primary 179 of an azimuth control transformer 180 having a secondary 181. Manual adjustment of the azimuth control slider contact 167 from the center or balancing position unbalances an A. C. bridge circuit, causing an alternating current flow through the primary 179 of the azimuth transformer 180, inducing a current in the secondary 181 the mean polarity of the induced A. C. potential in the conductors 182 and 183 connected to the secondary 181, depending upon which direction the "bridge" circuit is unbalanced. The conductors 182—183 are connected to a conventional electronic amplifier indicated generally at 184, the conductor 182 being connected to the grid 185 of a conventional vacuum tube 184a, while the conductor 183 is connected to the cathodes 186 and 187 of the tube through a conductor 188. A negative grid bias source 188' is interposed in the connection 183, supplying a negative bias to the grid 185 of the tube. The plate circuit includes a battery, or a conventional inverter type of power source 189, connected by conductors 191 and 193 to the plates 190 and 192, fixed resistors 191' and 193' respectively being interposed between the plates 190 and 192 of the tube 184a and the D. C. power source 189. The manually adjustable azimuth control potentiometer 166 is located at any convenient station within the aircraft and is preferably provided with a calibrated dial or adjustment indicating pointer, indicating the position of the slider 166' in terms of the degree in the azimuth position of the azimuth ring 26 from a central position where the bridge circuit of the potentiometer 43 balances the bridge circuit of the potentiometer 166 with the pointer indicating zero.

As schematically ilustrated in the wiring diagram, in Fig. 14, simplified electronic amplifiers are shown, although in actual practice multistage amplification is employed where greater electrical operating potential is required, particularly in the control and operation of the leveling motors 18 and 27 and the operation and control of the azimuth motor 41.

In the azimuth control circuit, the negative terminal of a battery or D. C. source 188'' is connected to the grid 195 of the amplifier tube 184a by a conductor 198 with a resistor 199 in the connection, supplying a negative bias to the grid 195.

The conductor 194 also connects the grid 195 to the plate 190 and a fixed condenser 196 is interposed in the connection between the plate 190 and the grid 195 in the conventional manner.

A polarized relay device, indicated generally at 199C in Fig. 14 is provided for controlling the direction of rotation of the azimuth motor 41 when the manually operable azimuth control slider 167 of the potentiometer 166 is adjusted to cause adjustment of the azimuth ring 26. Current is induced, by the primary 86 of the main power transformer in the center tap secondary 89 of the main transformer, the outer or end terminals of the secondary 89 being connected by conductors 200 and 201 to the plates 202 and 203 of a vacuum tube 204, having a grid 205 or connected grids 205—205' connected by conductor 206 to the plate 192 of the preceding amplifier tube 184a, a condenser 207 being interposed in the conductor 206. The center tap 89b of the secondary 89 of the main power transformer is connected by a conductor 208 through a ground connection to the adjacent terminals of a pair of relay magnets 209 and 210. The cathodes 211 and 212 of the vacuum 204 are connected by conductors 214 and 215 to the outer or relatively distant ends of a second pair of relay magnet coils 216 and 217, the adjacent ends of the magnets 216 and 217 being connected by conductors 218 and 219 to the outer ends of the magnets 209 and 210, respectively. The magnets 216 and 217 are disposed with their axes in alignment. The axes of the magnets 209 and 210 are also disposed in alignment. Relay contacts or armatures 218a and 219a are pivotally supported, respectively, between the adjacent ends of the magnets 216 and 217 and the magnets 209 and 210.

The azimuth motor 41 is preferably of the permanent magnet field type, current having a D. C. potential is supplied to the armature windings of the motor through conductors 220 and 221 from a suitable D. C. source indicated at 221b. Spaced relay contacts 222, 223 and 224, 225 are provided respectively at opposite sides of the relay contact blades 218a and 219a, with cross-over connectors 226 and 227 extending respectively between contacts 223 and 224, and between contacts 222 and 225, as shown in the drawings, the cross-over connectors 226 and 227 being connected intermediate their ends respectively to the conductors 221 and 220, and through the conductors 220a and 221a to the azimuth motor 41. A direct current power source, or battery 228, supplies a suitable negative grid bias to the grids 205 and 205' of the tube 204 through a conductor 229 connected to the negative terminal of the battery 228, a suitable fixed resistor 230 being interposed in the conductor 229. The cathodes 211 and 212 of the tube 204 are connected to the positive terminal of the battery 228 by conductors 231 and 232 having fixed condensers 233 and 234 therein.

The 115 volt, four hundred cycle A. C. which is connected to the primary 86 of the multistage power transformer is preferably from an electrical "inverter" type of power source, and preferably two independently operable "inverters" are employed in mapping airplanes, with suitable switch means, so that either "inverter" may be interchangeably used as the A. C. electrical power source. The inverter power source and switching arrangement therefor form no part of the present invention and are not disclosed in detail in the drawings or specifically described.

In actual practice it may also be desirable to employ two or more stabilized camera mounts. These mounts are placed one behind the other, preferably on the longitudinal center of the mapping aircraft. Each of the mounts is similar to the stabilized mount just described and functions independently, although it is contemplated that one mount could function as a master leveling unit and the other mount or mounts would be electrically connected through bridge circuits, controlled by potentiometers, adjusted by tilting and azimuth movements of the master unit, follow-up movement controlling potentiometers being provided and operated by the slave units to balance the aforesaid bridge circuits when the slave units are shifted to their positions as determined by the positions of the azimuth ring 26 of the master leveling unit.

In aerial mapping, in which pictures are taken in succession from an airplane flying a known course over territory to be photographed it is, of course, desirable that the exact position of the aircraft be determined with accuracy from certain triangulation points at the time each picture is taken. This can be accomplished by the use of radar, or shoran position determining systems with the radar or shoran stations located at known triangulation positions. An equally important requirement is that of maintaining the photographic axis of the camera vertical at all times. The improved leveling apparatus described above accomplishes this latter condition with a minimum degree of error.

In order to initially adjust the camera support to dispose the camera axis in true vertical position it is first preferable to have the main frame 12 as level as conveniently possible, although the apparatus may be calibrated with the main frame out of level to a considerable degree. The camera supporting azimuth ring 26 may now be leveled, after which it is only necessary to adjust the camera on the azimuth ring to level position in which the photographic axis of the camera is vertical and the focal plane of the film is horizontal. This is accomplished by adjusting the jack screws 34 and 34b and tightening the securing bolts 35 while observing the positions of the bubbles of the two transverse spirit levels 84 and 85. The azimuth ring 26 may be leveled by adjusting the position of the light beam projection and photocell unit 44 in the two transverse planes. The level position of the azimuth ring may be determined in any convenient manner such as by placing a spirit level across the top of the azimuth ring in both pitch and roll planes. Loosening of the clamping screws 54 and adjustment of the set screws 59 shift the photocell unit in the "roll" plane relative to the azimuth ring 26 and if the leveling mechanism is in operation the azimuth ring 26 will be correspondingly adjusted, after which the clamping screws 54 may be tightened to secure the photocell unit 44 in rigid relation to the azimuth ring in the "roll" plane. In adjusting the azimuth ring in "pitch" the securing bolt 52 is loosened and the screw 51 is then adjusted to shift the photocell unit until the level position of the azimuth ring is determined in the "pitch" plane. When the camera is mounted on the azimuth ring with the leveling apparatus in operation the adjustments of the fore and aft jack screws 34 and the offset jack screw 34a while observing the position of the bubbles in the spirit levels 84 and 85 within the lower portion of the camera case constitute means for disposing the camera axis in true vertical position or disposing the focal plane of the camera parallel to the top of the azimuth ring 26. Any subsequent leveling corrections of the camera C may be made by an adjustment of the photocell unit 44 about one or both of its adjustment axes. The leveling adjustment may be made at the factory, or at the installation depot, if desired, before the apparatus is installed in the aircraft.

*Operation*

When an aircraft is flown across a terrain to be photographed, with the leveling apparatus installed therein and in operation, with a mapping camera C mounted on the azimuth ring 26, the camera axis will be automatically maintained in a vertical or stabilized position at all times regardless of a considerable degree tilt of the aircraft in the pitch and roll planes and even during relatively short periods of acceleration of the aircraft and turns. The gyroscope rotor 62, being of the free or balanced type and the erection of the spin axis of the rotor to a vertical reference position by a positive and comparative slow erection means, utilizing only the frictional precessing torque on the rotor which is caused by the frictional driving engagement between the small ball-shaped extremity on the upper end of the depending pendulous or motor driven shaft and the internal surface of the inverted V-shaped supporting recess in the underside of the gyroscope rotor 62, average accelerations over a comparative long time period will be integrated to maintain the rotor spin axis at or extremely close to the true vertical at all times, except during extreme prolonged turns and accelerations.

Since the rotor spin axis is vertical the reflecting surface of the optical flat or mirror 65 rotates in a precise horizontal plane. When the azimuth ring 26 is level the flat rectangular beams of light from the projection lamps 67 and 67a will strike the surface of the revolving mirror 65 at its center in transverse intersecting planes and the light beams will be reflected upwardly, substantially at 45° angles of incidence, each beam passing equally through the adjacent edge portions of one pair of the cylindric lens elements 73, 73 or 73a, 73a any light passing through each of the cylindric lenses being concentrated on the elongated cathode element of the photoelectric cell which is located at the focus of the cylindric lenses. The relative illumination of the cathode elements of each pair of the photoelectric cells 69—70 or 69a—70a determines the leveling adjustments of the camera supporting platform 26. When the focal plane of the camera on the azimuth ring 26 and the reflecting surface 65 on the rotor 62 are parallel to each other, each pair of photocells receives an equal amount of light and the photocells become equally conductive, equal electric potential being impressed on the grids of each of the tubes 99, 100 associated with the phasing transformers 105 and 112, causing equal current flow through the two primaries 103, 104 and 110, 111 of each of the phasing transformers 105 and 112. Since the secondaries 106 and 113 of each of the phasing transformers 105 and 112 are connected in series to the intermediate amplifying stage 119, and are wound in opposition to each other, the phase of the current at the same respective ends of each of the secondaries 106 and 113 is opposite and the electric potentials are equal, the current in the circuit to the intermediate amplifying stage 119 is therefore zero. The battery or D. C. current source 128, through the resistor 129, supplies a comparative voltage to the grid 130 which in turn controls a comparative voltage of fixed polarity that is impressed on the primary 132' of the transformer 132. Although the electric outputs from the secondaries 106 and 113 are in opposition and equal, causing zero current flow in the circuit to the intermediate amplifying stages, as indicated above, the battery 122 supplies a grid bias to the grid of the tube 119' making this tube partially conductive. The potential of the grid 120 is pulsating in the phase and with the amplitude, resulting out of the co-operation of the transformer secondaries 106 and 113 depending upon which of the photocells is more conductive.

In the event that the camera C and the azimuth ring 26 are tilted the photocell light beam projection unit 44 carried thereby is also tilted, the gyroscope rotor 62 remaining fixed in space displays the light beam in the plane of tilt. Since the light beam normally passes equally through the adjacent edge portions of each of the cylindric lens members 73, 73 or 73a, 73a, and the beam is wide and thin, a minimum vertical displacement of the light beam relative to the cylindric lenses causes a maximum variation in the amount of light which is centered on the two photocells in the plane of tilt and light displacement. Depending upon the direction of tilt of the azimuth ring 26 relative to the plane of the reflecting surface of the mirror 65 one of the vacuum tubes 99 or 100 will be more conducting while the other tube will become less conductive, and as a result, an alternating current varying in phase and amplitude will be impressed on the grid 120 of the tube 119' in the intermediate amplifying stage 119, depending upon which photocell receives more light. The A. C. impressed on the grid 119 is amplified by the first stage of the tube 119' and the amplified potential is impressed on the grid 130 of the second stage of the same tube by the conductor 134 and the condenser 135. The second stage serves as a single drive stage supplying the primary 132' of the transformer 132, which is an input transformer for the push pull amplifier stage including the tubes 146 and 147, exciting the primary 154 of the output transformer 155 inducing current in the secondary winding 160 directly connected through the phase adapting condenser 164 to the control coil 161 of the two phase A. C. motor 18.

As the eddy current motor 18 or 27 rotates the D. C. dynamo 18a or 27c, driven thereby, causes an opposing D. C. potential to be impressed on the grids 97 or 98 or 97a or 98a of the vacuum tubes 99 or 100 or 99a or 100a. As the speed of the eddy current motor 18 or the eddy current motor 27 increases an opposing electrical current is built up, causing an electric dampening effect on the current controlled by the tubes 99, 100 or 99a, 100a, so that when the azimuth ring 26 and the camera axis approach their plumb positions and the light beam on the photocell control unit 44 effects a change in the grid potential on the tubes 99 and 100 or 99a, 100a, the electrical potential coming from the D. C. generator 18a or 27c and connected to the grids 97, 98 or 97a, 98a in opposition to the photocell potential impressed on the grids, causes a reduced A. C. amplitude to be supplied to the eddy current motors. As the speeds of the eddy current motors 18 or 27 are reduced the D. C. outputs from the electrical generators 18a or 27c are comparatively reduced, and the electrical dampening effects are correspondingly reduced. This electric dampening control of the eddy current leveling motors 18 and 27, by the current generated by the D. C. generators 18a and 27c which are driven by the eddy current motors, produces a rapid leveling adjustment of the azimuth ring 26, but at the same time, the dampening effect described, together with the low inertia of the rotating parts of the eddy current motors, affords a quick deceleration of the eddy current motors when the current is reduced or cut off without the usual "hunting" effect. During small or final leveling adjustments by the eddy current motors, the speed is somewhat reduced and the dampening effect is correspondingly reduced so that in the final leveling adjustment, or during very small adjustments, the dampening control effect is somewhat negligible. The efficiency of the dampening effect is adjustable by varying the resistance of the resistor 117.

In the event of cross winds the amount of drift is determined in the usual manner and the aircraft flight axis is shifted to maintain the ground track in the desired direction during the mapping operation. The azimuth control potentiometer 166 is then adjusted to the drift angle between the airplane heading and the ground track. The adjustment of the potentiometer slider 167 unbalances the bridge circuit to the primary 179 of the transformer 180 and in turn an electrical A. C. potential is induced in the secondary 181 of the transformer 180 and in the electronic amplifying stage 184. This adjusts the position of the polarized relay contact arms 218a and 219a which connect the D. C. azimuth motor 41 to the D. C. source, the polarity of the D. C. potential in the motor circuit being determined by the direction in which the slider 167 is adjusted. As the D. C. motor 41 rotates, the worm on shaft 40, meshing with the azimuth support gear segment 42, is adjusted and the balancing potentiometer slider 176, through the gear train 43a is correspondingly adjusted until the output circuit 182, 183 from the transformer secondary 181 is again balanced and the relay contacts 218a, 219a are opened. The azimuth motor 41 stops and the rotative adjustment of the azimuth ring 26 is discontinued with the longitudinal axis of the film or direction of film travel in the camera parallel to the ground track of the mapping aircraft.

In the event of an extreme tilt of the mapping aircraft in either of the "pitch" or the "roll" planes, the leveling mechanism will be simultaneously operated in an attempt to maintain the camera supporting platform level and the camera lens axis vertical, however, the relative extreme tilt of the main frame 12 with respect to the camera support 26 will close one or the other of the limit switches 81, 81, or 81a, 81a, inducing a counter, or opposing, A. C. potential in one or the other of the "bucking" coils 137 or 138 (or 137a or 138a) of the secondary 136' of the transformer 132. This "bucking" effect opposes current, ordinarily supplied to the grid 144 or 145 of the tube 146 or 147 by the connected half 136' of the transformer 132 and makes that tube less conductive and the output potential controlled by that tube is cut off, causing the eddy current motor which is employed to tilt the camera supporting azimuth ring 26 in that plane (of excessive tilt) to stop. Further tilting of the main frame 12 causes the camera supporting platform 26 and main frame 12 to tilt together as a unit. When the tilt of the main frame is reduced sufficiently to permit the limit switches 81, 81 or 81a, 81a to open, and disconnect the "bucking" coils 137 or 138 from the circuit the leveling action will again be operative.

When it is desired to employ a plurality of the camera leveling device for simultaneously taking a plurality of pictures, additional leveling devices are employed which may be adjusted by convenient bridge circuits to control the operation of the leveling motors in the added leveling devices in the manner described in connection with the azimuth motor control. Each of the leveling motors 18 and 27 and the azimuth motor drive shaft 40 of the first or "master" leveling control unit would be geared to adjust a potentiometer slider for unbalancing the respective circuits to the leveling motors 18 and 27 and the azimuth motors 41 of the other or "slave" leveling units, and the drive shafts with the leveling motors and the azimuth motor of the slave units would, through suitable gearing, actuate follow-up or balancing potentiometer sliders 176 to balance the bridge circuits afore-said when the azimuth rings 26 of the "slave" leveling units were adjusted to the identical position of the azimuth ring of the "master" unit.

As before set forth the wiring diagram in Fig. 14 discloses a simplified wiring circuit, employing a simple electronic amplifier stage but it is to be understood that multistage amplification may be employed in the construction and carrying out of the present invention without departing from the spirit of the invention as defined by the appended claims, also the present illustrated disclosure is for purposes of illustration and that this invention includes all modifications and equivalents which fall within the scope of the appended claims.

We claim:

1. In a follow-up system for sensitive elements, the combination with an A. C. source, sensitive and follow-up elements, amplifier means and reversible motor means connected to the amplifier means output for driving the follow-up element, of a light beam directing means on said sensitive element, photoelectric devices on the follow-up element adapted to intercept a variable amount of light from the light beam directing means as the relative position of the elements varies, a pair of grid-controlled vacuum tubes governed by said photoelectric devices, phase shifting means responsive to the varying relative resistance of said photoelectric devices controlled by the relative amount of light received by the photo-electric devices for oppositely shifting the phase on the input of the amplifier means to drive the motor means in an opposite direction, and direct current generator means driven by said reversible motor means having an electrical output connected to at least one of the grids of the vacuum tubes and operable by said reversible motor means to generate current of a predetermined potential relative to predetermined speeds of the reversible motor means to vary the grid potential of said connected vacuum tube in predetermined ratio to the rate and direction of rotation of the reversible motor means.

2. In a follow-up system for sensitive elements, the combination with relatively movable sensitive and follow-up elements and reversible two-phase eddy current motor means for relatively adjusting the said follow-up element, means for supplying current to one phase of the eddy current motor means, a pair of grid controlled vacuum tubes having their respective plate circuits amplified and electrically connected to the other phase of the eddy current motor means in a ninety degree out-of-phase relation to selectively rotate the motor means in one direction or the other, at predetermined rates, depending upon the relative plate current of the tubes, means for supplying a plate current to said tubes, a source of light on said follow-up element, a photoelectric device on said follow-up elements having at least two spaced cathodes, means operable by the sensitive element for varying the relative amount of light received by each of the cathodes according to the relative angular displacement between the sensitive and the follow-up elements, fixed grid bias means between each of said cathodes and the grids of the tubes to predetermine the plate circuit of said tubes to control the phase and potential in the connected phase circuit to the eddy current motor, to selectively drive the eddy current motor in one direction or the other at predetermined speeds in a predetermined ratio to the variation phase and potential in the connected phase of the eddy current motor, and a D. C. generator driven by the eddy current motor having an electrical output connected to the grid and cathode of at least one of the vacuum tubes to vary the bias current potential on the grid of said tube relative to the potential impressed thereon by the connected cathode of the photoelectric device in a predetermined ratio to the rate and direction of rotation of the eddy current motor.

3. In an attitude determining device, a support, a mirror adjustably carried thereby, vertical reference means for stabilizing the plane of a mirror in a predetermined plane relative to predetermined changes in attitude of support relative to the vertical reference means, light beam projecting means on the support for projecting two inclined substantially flat wide beams of light onto the surface of the mirror in transverse intersecting planes, two pairs of photoelectric cell devices disposed on the support, the photoelectric cells of each pair being disposed in juxtaposed side-by-side relation, one photoelectric cell device being disposed on each side of the median plane of each of the intersecting light beams to selectively receive equal amounts of light from the light beam projected in that plane and reflected by the mirror surface, when the support is disposed in a predetermined reference attitude position and to selectively receive unequal amounts of light reflected by the mirror surface when the support is tilted in that plane relative to the mirror surface and vertical reference means due to change in attitude between the support and the mirror, electrically operable rotary means selectively controlled by said photoelectric cell devices operable in one direction in predetermined ratio to light received by one of said photoelectric cells at one side of said median light plane and operable in the opposite direction by the light received by the photocell at the opposite side of said median light plane.

4. In an attitude determining device, a supporting member subject to tilting movements, a rotary mirror tiltably carried by the supporting member, vertical reference means carried by the supporting members for maintaining the mirror reflecting surface in a horizontal plane during changes in attitude of the supporting member relative to the vertical reference means, light beam projection means on the supporting member for projecting flat beams of light onto the surface of the mirror in inclined transverse planes intersecting at substantially the rotary axis of the mirror, a pair of elongated cylindric lenses disposed on the supporting member in parallel juxtaposed relation at opposite sides of the angle of instance of each of the light beams reflected from the mirror with the juxtaposed portions of the lenses in the median plane of the light beam when the mirror is in horizontal reference position relative to the vertical reference means and the support is level, for concentrating the reflected light rays received by each of the cylindric lenses at the focal line of the lenses, a pair of photoelectric cell circuit controlling means for each light beam mounted on the supporting member, each having an elongated cathode element disposed at the focal line of each of the lenses to receive substantially all the light projected through the cylindric lenses, electronic amplifying means having an electronically amplified output circuit selectively controlled by each pair of photoelectric cell devices, reversible electric motor means in said output circuits for moving said supporting member in each of said transverse intersecting planes, including electronic amplifying means connected to each of the aforesaid photocell output circuits for amplifying the output circuit controlled by each pair of photoelectric cell devices, an electrical output circuit connected respectively to the reversible motor means and the last mentioned amplifying means for selectively energizing the electrical motor means to rotate the same in opposite directions and at predetermined rates at a predetermined ratio to the polarity and amplitude of the electrical potential received from each of said last mentioned electronic amplifying means.

5. In a camera leveling device, a support subject to tilting displacement, a platform gimbaled thereon for supporting a mapping camera with its photographic axis in a vertical position, a pendulous motor gimbaled on the platform with a drive shaft axis disposed vertically, a free gyroscope rotor tiltably mounted on said drive shaft having a mirror fixed thereon in a plane transverse to the rotary axis of the gyroscope rotor, erecting means between the drive shaft and the rotor for erecting the axis of the rotor to the vertical reference position of the motor drive shaft axis, light beam projecting means on the platform for projecting two inclined flat wide beams of light onto the reflecting surface of the mirror in transverse intersecting vertical planes, two pairs of side-by-side photoelectric cell devices fixed relative to the platform in said transverse intersecting planes, constructed and arranged to selectively receive substantially equal amounts of the light reflected by said mirror in the respective transverse planes when the gyro rotor axis is vertical and the platform is horizontal, and to selectively receive predetermined different amounts of the light reflected by the mirror when the platform is tilted relative to the vertical axis of the gyroscope rotor, an electrical output circuit controlled by each photoelectric cell device, electronic amplifying means disposed on the platform adjacent each of the photoelectric cell devices and connected to the photoelectric cell controlled circuits for amplifying the current controlled by said photoelectric cell devices, secondary electronic amplifying means connected to the first amplifying means for amplifying the current from the first electrical amplifying means, electric motor means disposed on the platform gimbal means and electrically connected to the secondary amplifying means, an operating connection between the electric motor means and the platform and between the electric motor means and the support for adjusting the position of the platform relative to the support in a predetermined ratio to the amplitude of the electrical output of the second current amplifying means and in a predetermined direction to the polarity of said electrical output, electric potential generating means operable by said electric motor means for generating an electrical current having a predetermined polarity and potential in predetermined ratio to the direction and rate of rotation of the electric motor means and electric circuit connections between said electric current generating means and the first electrical amplifying means for impressing the output potential of the electric potential generating means onto the grid of at least one tube of the first mentioned electronic amplifying means to vary the plate current potential in predetermined ratio to the rate and direction of rotation of the electric motor means.

6. In a camera leveling mount for mapping cameras, a rigid supporting frame adapted to be carried by an aircraft, outer and inner gimbals carried by said frame for tilting displacement in transverse intersecting vertical planes, two phase eddy current motor leveling means operable between the rigid frame and the outer gimbal member, a second two phase eddy current motor leveling means operable between the inner and outer gimbals, a supporting platform rotatably journalled on said inner gimbal for rotation in azimuth, electric motor means operable between the inner gimbal and the platform for adjusting said supporting platform in azimuth, a photoelectric cell and light beam leveling unit adjustably secured on said platform including a gravity erected reference member having a vertical reference axis, a mirror fixed on said reference member having a flat reflecting surface disposed in a plane perpendicular to the vertical reference axis with a center concentric to the vertical reference axis, light beam projecting means fixed on said leveling unit for projecting two inclined flat beams of light onto the reflecting surface of the mirror in transverse intersecting planes at similar angles of incidence intersecting at the vertical reference axis when the platform is level and the reference axis is vertical, a pair of positive elongated parallel cylindric lens elements disposed in juxtaposed edge-to-edge relation in a plane perpendicular to the median plane of each of the reflected flat light beams with the abutting longitudinal edge portions of the lens members lying in the median plane when the platform is level and the vertical reference axis is vertical, said cylindric lens elements each having a focal line disposed at each side of the median plane of the light beam, a photoelectric cell carried by the photocell and light beam projection unit receiving light from each cylindric lens element having an elongated cathode plate disposed substantially on the focal line of each cylindric lens element and an anode, electrical control circuits connected to the anode and cathode plates of each pair of the photoelectric cells, a source of alternating current, a pair of dual plate and grid triode vacuum tubes for each pair of the photoelectric cells, each tube having grid means connected to the cathode plate of one of the photoelectric cell members, transformer means for each pair of photocell members having a primary connected to the alternating current source and a center tap secondary, a circuit connection between the center tap of said secondary and the cathodes of the said pair of associated vacuum tubes, a grid bias source connected between the grids afore- said and the cathodes of each of the vacuum tubes in each pair, a reversible D. C. generator for each pair of vacuum tubes, each generator having an electrical output circuit connected between the cathode and grid of at least one of the associated vacuum tubes of each pair, for varying the grid potential on the grid of the connected vacuum tube, with respect to the grid potential on the grid of the other associated vacuum tube in a predetermined ratio to the rate and direction of rotation of the D. C. generator, driving means between each of the leveling motors and the D. C. generator means associated with the photocells and vacuum tubes that are made electrically more or less conductive by the light beam which is displaced by operation of that leveling motor, a pair of phasing transformers for each light beam projecting means, each transformer having a pair of opposing primaries and a secondary, the opposing primaries of each of the phasing transformers being connected at one end to the plates of one of the vacuum tubes for each of the photoelectric cells controlled by that light beam, an electrical output circuit, said phasing transformer secondaries being connected in said output circuit in series in opposition to each other, connections between the other ends of the primaries of the phasing transformers and the outer ends of the center tap secondary of the first-mentioned transformer for selectively inducing a unidirectional electric potential in the secondary of each of the phasing transformers, comparative voltage electronic amplifier means including dual plate grid and cathode vacuum tube means having a predetermined output controlled by one of said last plate grid and cathode elements, a second transformer means having a center tap secondary and a primary, circuit connections between the primary of the second center tap secondary transformer and the output of said comparative voltage amplifier means, a second output voltage circuit from said vacuum tube amplifier means including means for impressing a predetermined grid potential on the grid of the last mentioned tube amplifier means to control the polarity and potential of the current in said comparative voltage output circuit depending upon which of the photoelectric cell members are conductive and the relative extent of the conductivity of the connected photoelectric cell members, means for impressing the comparative voltage potential and polarity, controlled by the grid of the tube, on the voltage in the first-mentioned comparative voltage circuit, dual vacuum tube amplifying means, an output circuit for each of the center tap secondaries of the said center tap secondary transformer means comprising a center tap primary transformer having the center tap connected to the cathodes of the last mentioned dual vacuum tube amplifying means, the opposite ends of the primary being connected to the plates of the last dual vacuum tube amplifying means, a secondary for the last mentioned center tap primary transformer connected to one phase of the two-phased eddy current leveling motor means, separate predetermined phase supplying transformer means having a primary connected to the A. C. electrical supply and secondary means connecting the last secondary to the second phase of the eddy current motor means, and means for shifting the phase in one of said eddy current motor phase circuits to dispose the phases in 90° out-of-phase relation.

7. In a stabilizing apparatus of the class described, a main frame subject to tilting displacements in mutually intersecting vertical planes, a supporting platform gimbaled on the main frame for relative tilting movements in said transverse intersecting vertical planes, a pair of leveling motors operable between the main frame and the supporting platform for tilting the platform relative to the main frame in said transverse vertical intersecting planes, a photocell and light beam projection unit adjustably supported on said supporting platform comprising a gyroscope rotor disposed in said unit having three degrees of freedom, a gravity actuated erection means for erecting the rotor spin axis to a vertical reference position, a mirror fixed on said rotor having a reflecting surface disposed in a plane perpendicular to the rotor spin axis, a pair of light beam projectors fixed in said unit, constructed and arranged to project similar flat wide beams of light onto the reflecting surface at similar angles of incidence in said transverse intersecting vertical planes, when the supporting platform and the reflecting surface are parallel, a pair of parallel plano-cylindric lens elements disposed in edge-to-edge juxtaposed relation in a plane perpendicular to the median plane of each of the reflected light beams with the juxtaposed edges of each pair in the median plane of one of the flat wide light beams, a pair of photoelectric cells receiving light from each light beam, fixedly disposed in said unit at opposite sides of the median plane of each light beam, each photocell being fixedly disposed with a cathode element at the focus of each of the parallel-plano-cylindric lens elements, parallel motor energizing circuits for each leveling motor connecting each pair of the photocells including electronic amplifier means in said circuits for operating the leveling motors to adjust the platform to parallel relation with the rotor carried reflecting surface to maintain the median plane of the light beam coincident with the adjacent edges of the parallel-plano-cylindric lens elements.

8. In support stabilizing apparatus of the class described, a main frame subject to tilting displacements in transverse intersecting vertical planes, a supporting platform to be leveled, gimbal means between the frame and platform for supporting the platform on the frame for tilting adjustments in transverse intersecting vertical planes, power adjusting means between the gimbal means, the frame, and the platform, selectively operable to adjust the platform relative to the frame in said transverse intersecting vertical planes, a leveling control unit adjustably mounted on the platform comprising means for projecting two beams of light downwardly in transverse intersection vertical planes, a gravity erected gyroscope rotor having a vertical reference spin axis passing through the intersection of the light beams, a reflecting mirror carried by said gyroscope rotor with its reflecting surface disposed in the path of said light beams and perpendicular to the rotor spin axis to reflect the light beams, photoelectric cell control means comprising pair of photoelectric cell control elements, disposed at opposite sides of the reflected light beams to be activated by each of said light beams, means electrically energized by each of the photoelectric cell control elements for actuating the power adjusting means to adjust the platform in one direction relative to the frame in the plane of the light beam activating that photoelectric cell control element, said photoelectric cell elements comprising elongated photocells disposed at opposite sides of each of the reflected light beams, when the gyroscope rotor spin axis is vertical and the platform is level, a pair of elongated side by side cylindric lens elements mounted in a plane transverse to each of the reflected light beams with their adjacent edges disposed in the median plane of the reflected light beam and transverse to the direction of relative displacement of the reflected light beam when the platform tilts, the said cylindric lens elements each being located to dispose the focus thereof substantially at the cathode of one of the photoelectric cell elements, adjusting means between the leveling control unit and the platform for adjusting the position of the leveling control unit relative to the platform to adjust the stabilized reference position of the supporting platform with respect to the vertical reference position of the rotor spin axis.

9. In a support stabilizing apparatus as claimed in claim 8, a camera mounted on said platform and adjusting means between the camera and the platform for adjusting the camera relative to the platform in transverse intersecting vertical planes.

10. In a support stabilizing apparatus as claimed in claim 8, dampening means driven by each of the power actuating means having a power output connected to the said power adjusting means for dampening the operation of the same to decelerate the same when the photoelectric cell activation controlling that power adjusting means is reduced.

11. Apparatus as claimed in claim 8 comprising balanced electronically amplified control circuits connected to said photoelectric cell elements to be proportionally energized by each of the photoelectric cell elements having electrical outputs connected to the power adjusting means, and a dampening control circuit including a current generator driven by the power adjusting means having an electrical output connected to the electronically amplified control circuits for inducing a counter electric potential in said electronically amplified control circuits to immediately decrease the actuation of the power adjusting means when the electrical output controlled by the photoelectric cell element is reduced.

12. In apparatus of the class described, a portable support, outer and inner gimbals carried by the support for tilting adjustment in transverse intersecting vertical planes, a supporting platform carried by the inner gimbal for rotative adjustments in azimuth, electric motor means carried by the outer gimbal, an operating connection between the motor means and the support for adjusting the outer gimbal relative to the support in one of said transverse intersection vertical planes, a second electric motor means on the outer gimbal, an operating connection between the inner gimbal and the second motor means for adjusting the inner gimbal relative to the outer gimbal in the other transverse intersection vertical plane, electric motor means connected between the inner gimbal and the platform for adjusting the platform in azimuth relative to the inner gimbal, a gyroscope gimbaled on the platform having a spin axis, gravity erected vertical reference means suspended from the platform for determining a vertical reference including a motor, erecting means between the motor and the gyroscope rotor for driving the rotor and erecting the spin axis thereof to a corresponding vertical reference position, relatively horizontal reference means carried by the rotor comprising a mirror fixed to the rotor to rotate therewith having a reflecting surface disposed in a plane transverse to the rotor spin axis, a pair of light beam projectors fixed on said platform for projecting two concentrated flat wide beams of light downwardly at similar angles of incidence in transverse vertical planes passing through the rotor spin axis, a pair of elongated photoelectric cell control elements, disposed at opposite sides of each of the median planes of the reflected light beams, to be activated by the light projected in that plane and reflected by the reflecting surface, said photoelectric cell control elements of each pair including cathode and anode elements disposed in a plane transverse to the median plane of each of the light beams with the longitudinal axes of each pair parallel to the median plane of the associated light beam, a pair of parallel elongated cylindric lens elements disposed in edge to edge relation in a plane perpendicular to the median plane of each of the reflected light beams, between the photoelectric cells and the reflecting surface of the rotor, with the cathode of each one of the photocells disposed substantially at the focus of each of the cylindric lens elements and in parallel relation to the cathode element of the photoelectric cell, an electrical control circuit connected to the anode and cathode elements of each pair of photoelectric cells, a source of electrical energy for energizing said control circuits, electronic amplifier means connected to each of said control circuits having an electrical output circuit connected to the electric motor means for tilting the platform in the plane of the light beam activating the photoelectric cell, an electrical generator driven by each of the first and second electric motor means having an electrical output circuit connected in the electrical motor energizing circuit between the same and the photoelectric cells for introducing a predetermined opposing electrical potential in the electric motor energizing circuit in predetermined ratio to the rate of operation of the electric motor means to produce an electrical dampening effect on the electric motor control circuit when the current in said electrical control circuit is reduced.

13. Apparatus as claimed in claim 11 in which the first and second electrical motor means comprise eddy current motors having a thin light cup-shaped armature to provide a low inertia armature.

14. In an instrument leveling apparatus, a support subject to inclined displacements in at least two intersecting vertical planes, a platform carried by said support and adjustable in the aforesaid planes, leveling means between the support and platform for adjusting the same comprising a pair of two phase alternating current motors each having a fixed phase and a controlling phase disposed in a 90° out of phase relation to the fixed phase, and connected between the platform and support for relatively moving the platform in one of the aforesaid intersecting planes, a pair of alternating circuits for each motor having their phases disposed in 180° out of phase relation to each other and 90° out of phase relation to the fixed phase and connected to the controlling phase of the connected motor whereby the said phases and amplitude of the current oppose each other to control the phase and amplitude of the current imposed on the controlling phase of the connected motor, a pair of photocells disposed in side by side relation on the platform, vacuum tube means connected in each of said circuits including a grid connected to each of the photocells, selectively controlling the relative amplitude of the A. C. in said circuits and the phase and potential of the A. C. imposed on the controlling phase of the connected adjusting motor means in proportion to the light received by the photocells, a source of concentrated illumination carried by the platform for projecting a light beam toward each pair of photocells, gravity actuated means carried by said platform having means disposed in the path of the light beams from said concentrated sources of illumination for displacing the light beams received by the side by side photocells in predetermined ratio to the relative inclination between the platform and the gravity actuated means, when the platform tilts to cause the photocell receiving an increased illumination to increase the potential in its connected phase circuit to produce a predominance in the phase amplified in the connected circuit to the controlling phase of the connected adjusting motor to adjust the platform toward a level position relative to the position of the gravity leveling means.

CLAUS ASCHENBRENNER.
ULRICH K. HEIDELAUF.
HERMAN MESTWERDT.
BRUNO K. WERNICKE.

REFERENCES CITED

The following references are of record in the file of this patent:

UNITED STATES PATENTS

| Number | Name | Date |
|---|---|---|
| 1,999,646 | Wittkuhns | Apr. 30, 1935 |
| 2,167,484 | Berry | July 25, 1939 |
| 2,352,103 | Jones | June 20, 1944 |
| 2,375,159 | Wills | May 1, 1945 |
| 2,414,430 | Nisbet | Jan. 14, 1947 |
| 2,429,657 | Wolfert et al. | Oct. 28, 1947 |
| 2,446,096 | Moore | July 27, 1948 |
| 2,446,325 | Gille | Aug. 3, 1948 |
| 2,475,132 | Eagen | July 5, 1949 |

FOREIGN PATENTS

| Number | Country | Date |
|---|---|---|
| 516,185 | Great Britain | Dec. 27, 1939 |